US011472246B2

(12) United States Patent
Bosschieter et al.

(10) Patent No.: US 11,472,246 B2
(45) Date of Patent: Oct. 18, 2022

(54) TOWABLE VEHICLE

(71) Applicant: Bruder Expedition Pty Ltd, Morningside (AU)

(72) Inventors: Daniel Bosschieter, Moorooka (AU); Tobias Bosschieter, Mt Gravatt (AU); Anthony Gibson, Gladstone (AU)

(73) Assignee: BRUDER IP PTY LTD, Richlands (AU)

( * ) Notice: Subject to any disclaimer, the term of this patent is extended or adjusted under 35 U.S.C. 154(b) by 0 days.

(21) Appl. No.: 16/632,984

(22) PCT Filed: Jul. 19, 2018

(86) PCT No.: PCT/AU2018/050758
§ 371 (c)(1),
(2) Date: Jan. 22, 2020

(87) PCT Pub. No.: WO2019/018885
PCT Pub. Date: Jan. 31, 2019

(65) Prior Publication Data
US 2020/0207171 A1 Jul. 2, 2020

(30) Foreign Application Priority Data
Jul. 24, 2017 (AU) .............................. 2017902895

(51) Int. Cl.
*B62D 21/20* (2006.01)
*B60G 11/27* (2006.01)
(Continued)

(52) U.S. Cl.
CPC ............... *B60G 11/27* (2013.01); *B60G 3/14* (2013.01); *B60G 7/003* (2013.01); *B60G 7/006* (2013.01);
(Continued)

(58) Field of Classification Search
CPC .... B60G 2300/04; B60G 13/006; B60P 3/343
See application file for complete search history.

(56) References Cited

U.S. PATENT DOCUMENTS 4,379,572 A    4/1983   Hedenberg
4,542,933 A *   9/1985   Bischoff .................. B60P 3/32
                                                                                 296/164
(Continued)

FOREIGN PATENT DOCUMENTS

AU      2012216240 B1 *   8/2013
AU      2013206486 A1 *   1/2015
(Continued)

OTHER PUBLICATIONS

Written Opinion of the International Search Authority along with the International Search Report (PCT/AU2018/050758), dated Oct. 12, 2018.

(Continued)

*Primary Examiner* — James A English
(74) *Attorney, Agent, or Firm* — Howard & Howard Attorneys LLC

(57) ABSTRACT

A towable vehicle including a chassis, at least two wheels and a suspension assembly supporting each wheel. The suspension assembly includes a swing arm pivotally mounted to the chassis, an axle mounted proximate an end of the swing arm, the wheel being mounted on the axle, at least one shock absorber extending from the chassis to the swing arm, an airbag swing arm mounting pivotally coupled to the swing arm, an airbag chassis mounting coupled to the chassis, an airbag coupled to the airbag swing arm and airbag chassis mountings so that inflation of the airbag allows a suspension height to be adjusted over an operating range and a pivot arm pivotally mounted to the chassis and (Continued)

the airbag swing arm mounting to maintain an orientation of the airbag swing arm mounting over the operating range.

19 Claims, 17 Drawing Sheets

(51) Int. Cl.
  *B60G 3/14* (2006.01)
  *B60G 7/00* (2006.01)
  *B62D 33/04* (2006.01)
  *B62D 59/04* (2006.01)

(52) U.S. Cl.
  CPC ............ *B62D 21/20* (2013.01); *B62D 33/046* (2013.01); *B62D 59/04* (2013.01); *B60G 2202/152* (2013.01); *B60G 2300/04* (2013.01); *B60G 2400/252* (2013.01); *B60G 2500/205* (2013.01); *B60G 2500/2021* (2013.01)

(56) References Cited

U.S. PATENT DOCUMENTS

| | | | |
|---|---|---|---|
| 5,015,004 A * | 5/1991 | Mitchell | B60G 11/27 280/5.521 |
| 5,342,106 A * | 8/1994 | Fischer | B62D 27/04 296/164 |
| 8,844,956 B2 * | 9/2014 | Boler | B60G 9/003 280/124.116 |
| 2002/0130474 A1 * | 9/2002 | Richardson | B60G 11/27 280/5.507 |
| 2010/0213397 A1 * | 8/2010 | Trudeau | B60G 17/0525 251/129.01 |
| 2010/0270523 A1 * | 10/2010 | Schmitt | B66F 7/08 254/93 R |
| 2014/0246893 A1 * | 9/2014 | Tesar | B60K 7/0007 301/6.5 |

FOREIGN PATENT DOCUMENTS

| | | |
|---|---|---|
| GB | 2371278 A | 7/2002 |
| RU | 2020 107 516 A | 7/2018 |

OTHER PUBLICATIONS

International Preliminary Report on Patentability (PCT/AU2018/050758), dated Jun. 11, 2019.

Russian Office Action dated Oct. 22, 2021, Application No. 2020107516/11(012071), Filing Date Jul. 19, 2018, 4 pages.

European Search Report dated Mar. 2, 2021, Application No. 18828204.8-1009 / 3658393, 8 pages.

* cited by examiner

TOWABLE VEHICLE

CROSS-REFERENCE TO RELATED APPLICATIONS

The present application is the National Stage of International Patent Application No. PCT/AU2018/050758, filed Jul. 19, 2018, which claims priority to and all the benefits of Australian Patent Application No. 2017902895, filed Jul. 24, 2017, all disclosures of which are expressly incorporated herein by reference in their entirety.

BACKGROUND OF THE INVENTION

The present invention relates to a towable vehicle and in one example a suspension assembly for a towable vehicle. The present invention also relates to a scissor mechanism for relatively moving bodies, such as for lifting a roof of a caravan.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Caravans and other towable vehicles are often used in a wide range of different environments. When used in off road environments, the towable vehicles typically require greater strength and suspension in order to cope with the rigors of the rough terrain. However, in many towable vehicles the range of suspension travel is limited leading to the vehicles bottoming out on the terrain, which in turn can lead to damage or vehicles becoming stuck. Furthermore, as most caravans are formed from a shell rigidly attached to a chassis, flexure of the chassis when traversing rough terrain often leads to shell failure.

Typically, mechanisms for addressing these issues include providing additional structural elements, such as skid plates and strengthening beams, which in turn leads to an increase in vehicle weight, which is undesirable as this can impact on fuel economy, damage the environment and increase the risk of bogging.

SUMMARY OF THE PRESENT INVENTION

In one broad form an aspect of the present invention seeks to provide a towable vehicle including: a chassis; at least two wheels; and, a suspension assembly supporting each wheel, the suspension assembly including: a swing arm pivotally mounted to the chassis; an axle mounted proximate an end of the swing arm, the wheel being mounted on the axle; at least one shock absorber extending from the chassis to the swing arm; an airbag swing arm mounting pivotally coupled to the swing arm; an airbag chassis mounting coupled to the chassis; an airbag coupled to the airbag swing arm and airbag chassis mountings so that inflation of the airbag allows a suspension height to be adjusted over an operating range; and, a pivot arm pivotally mounted to the chassis and the airbag swing arm mounting to maintain an orientation of the airbag swing arm mounting over the operating range.

In one embodiment at least one of the pivot arm and the swing arm are adjustable to at least one of: adjust an orientation of the airbag swing arm mounting; and, control a degree of tension or compression in the pivot arm.

In one embodiment the pivot arm is adjustable by adjusting at least one of: a length of the pivot arm; and, a pivot position of the pivot arm.

In one embodiment the pivot arm is pivotally mounted to a pivot arm cam provided in a pivot arm cam mounting in the chassis so that rotation of the pivot arm cam adjusts the pivot position of the pivot arm.

In one embodiment the swing arm is pivotally mounted to a swing arm cam provided in a swing arm cam mounting in the chassis so that rotation of the swing arm cam adjusts the pivot position of the swing arm.

In one embodiment at least one of the pivot arm and the swing arm are adjusted based on the operating range.

In one embodiment the airbag is adjustably mounted to the airbag chassis mounting.

In one embodiment the airbag is mounted to an airbag cam provided in an airbag cam mounting on the chassis so that rotation of the cam adjusts the position of the airbag.

In one embodiment the airbag is mounted substantially above the axle.

In one embodiment the suspension assembly includes two laterally spaced swing arms supporting the axle.

In one embodiment the suspension assembly includes two laterally spaced shock absorbers.

In one embodiment the pivot arm is laterally curved to pass between the laterally spaced shock absorbers.

In one embodiment the at least one shock absorber is mounted one of: forwardly of the airbag; and, rearwardly of the airbag.

In one embodiment the chassis includes a base section and an elevated section raised relative to the base section, the airbag chassis mounting and shock absorber being coupled to the elevated section and the swing and pivot arms being coupled to the base section.

In one embodiment the towable vehicle includes a body.

In one embodiment the body is a rigid body mounted to the chassis via a number of body mountings.

In one embodiment the body mountings include an elastically deformable member to absorb forces between the chassis and body.

In one embodiment the body is made of a number of interconnected rigid body panels.

In one embodiment the rigid body panels include bevelled edges interconnected by mitre joints.

In one embodiment joins between rigid body panels are covered by at least one of: a silicone sealant; internal joining plates spanning the join; and, external joining plates spanning the join.

In one embodiment the joining plates are formed from at least one of: aluminium extrusions; plastic; and, fibre reinforced plastics.

In one embodiment the towable vehicle includes a roof section that can be moved between retracted and extended positions using a scissor mechanism, the scissor mechanism including: a first rail mounted to the body; a second rail mounted to the roof section; a pair of scissor arms including: a first scissor arm having: a first end pivotally mounted to the first rail; a second end slidably mounted to the second rail; and, a curved slot extending from a centre of the arm proximate the second end to an inner edge of the arm proximate a mid-point; a second scissor arm having: a first end pivotally mounted to the second rail; a second end slidably mounted to the first rail; and, a slot extending from a centre of the arm proximate the second end to an inner edge of the arm proximate a mid-point; a pivotal connection between the mid-points of the first and second arms; an actuator; and, a biasing pin slidably mounted within the slots so that movement of the biasing pin along the slots by the actuator causes the scissor arms to pivot about the pivotal connection thereby relatively moving the first and second bodies.

In one embodiment the slots are at least one of angled and curved proximate the second end to provide a wedging action and thereby reduce the biasing force required to move the scissor arms from a retracted position.

In one embodiment the slots are curved towards the centre of the arm, with an increasing radius of curvature towards the second end.

In one embodiment each scissor arm includes two laterally spaced interconnected side plates, the side plates of one scissor arm being located between the side plates of the other scissor arm, and each side plate including a respective slot, the biasing pin extending through the slots in each side plate.

In one embodiment the actuator includes a threaded linear drive.

In one embodiment the scissor mechanism includes a pair of supporting arms for supporting the actuator relative to the scissor arms, the pair of supporting arms including: a first supporting arm having: a first end pivotally mounted to the first rail; and, a second end pivotally mounted to the actuator; and, a second supporting arm having: a first end pivotally mounted to the second rail; and, a second end pivotally mounted to the actuator, to thereby support the actuator.

In one embodiment each supporting arm includes two laterally spaced interconnected supporting arm side plates, the supporting arm side plates of one supporting arm being located between the side plates of the other supporting arm at the second end of each supporting arm.

In one embodiment the towable vehicle includes at least one drive that drives a respective wheel, the at least one drive being supported by a corresponding suspension assembly.

In one embodiment the drive includes: a motor; a motor gear coupled to the motor; a drive gear mounted on the axle; and, a drive actuator that selectively engages the motor and drive gears to thereby selectively engage the drive.

In one embodiment the towable vehicle includes: a compressed air supply; feed lines coupling the compressed air supply to the airbags; a number of control valves; and, a controller that controls the control valves to thereby selectively supply air to the airbag to thereby adjust the suspension height.

In one embodiment the towable vehicle includes: a drive coupled to at least one of the wheels; and, a controller for controlling the drive to thereby drive the at least one wheel.

In one embodiment the drive includes a motor and a drive actuator, wherein the controller controls the drive actuator to thereby selectively engage motor and drive gears and thereby mechanically couple the motor to the axle.

In one embodiment the controller controls at least one of a suspension and drive in accordance with at least one of: signals from a chassis orientation sensor; input commands provided by a user; signals from a remote client device; and, signals from a vehicle.

In one broad form an aspect of the present invention seeks to provide a scissor mechanism for relatively moving first and second bodies, the scissor mechanism including: a pair of scissor arms including: a first scissor arm having: a first end pivotally mounted to the first body; a second end slidably mounted to the second body; and, a curved slot extending from a centre of the arm proximate the second end to an inner edge of the arm proximate a mid-point; a second scissor arm having: a first end pivotally mounted to the second body; a second end slidably mounted to the first body; and, a slot extending from a centre of the arm proximate the second end to an inner edge of the arm proximate a mid-point; a pivotal connection between the mid-points of the first and second arms; an actuator; and, a biasing pin slidably mounted within the slots so that movement of the biasing pin along the slots by the actuator causes the scissor arms to pivot about the pivotal connection thereby relatively moving the first and second bodies.

In one embodiment the slots are at least one of angled and curved proximate the second end to provide a wedging action and thereby reduce the biasing force required to move the scissor arms from a retracted position.

In one embodiment the slots are curved towards the centre of the arm, with an increasing radius of curvature towards the second end.

In one embodiment each scissor arm includes two laterally spaced interconnected side plates, the side plates of one scissor arm being located between the side plates of the other scissor arm, and each side plate including a respective slot, the biasing pin extending through the slots in each side plate.

In one embodiment the actuator includes a threaded linear drive.

In one embodiment the scissor mechanism includes a pair of supporting arms for supporting the actuator relative to the scissor arms, the pair of supporting arms including: a first supporting arm having: a first end pivotally mounted to the first body; and, a second end pivotally mounted to the actuator; and, a second supporting arm having: a first end pivotally mounted to the second body; and, a second end pivotally mounted to the actuator, to thereby supporting the actuator.

In one embodiment each supporting arm includes two laterally spaced interconnected supporting arm side plates, the supporting arm side plates of one supporting arm being located between the side plates of the other supporting arm at the second end of each supporting arm.

In one embodiment the scissor mechanism includes rails coupled to the bodies, the arms being mounted to the rails.

In one broad form an aspect of the present invention seeks to provide a towable vehicle including: a chassis; at least two wheels mounted to the chassis; and, a body, the body including a number of rigid body panels interconnected to form a self supporting rigid body having a base, roof, side and end walls, the body being mounted to the chassis via a number of body mountings.

In one embodiment the body mountings include an elastically deformable member to absorb forces between the chassis and body.

In one embodiment the rigid body panels are fibreglass composite panels.

In one embodiment the rigid body panels include bevelled edges interconnected by mitre joints.

In one embodiment joins between rigid body panels are covered by at least one of: a silicone sealant; internal joining plates spanning the join; and, external joining plates spanning the join.

In one embodiment the joining plates are formed from at least one of: aluminium extrusions; plastic; and, fibre reinforced plastics.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Various examples and embodiments of the present invention will now be described with reference to the accompanying drawings, in which:—

DETAILED DESCRIPTION OF THE PREFERRED EMBODIMENTS

Figure 1A:
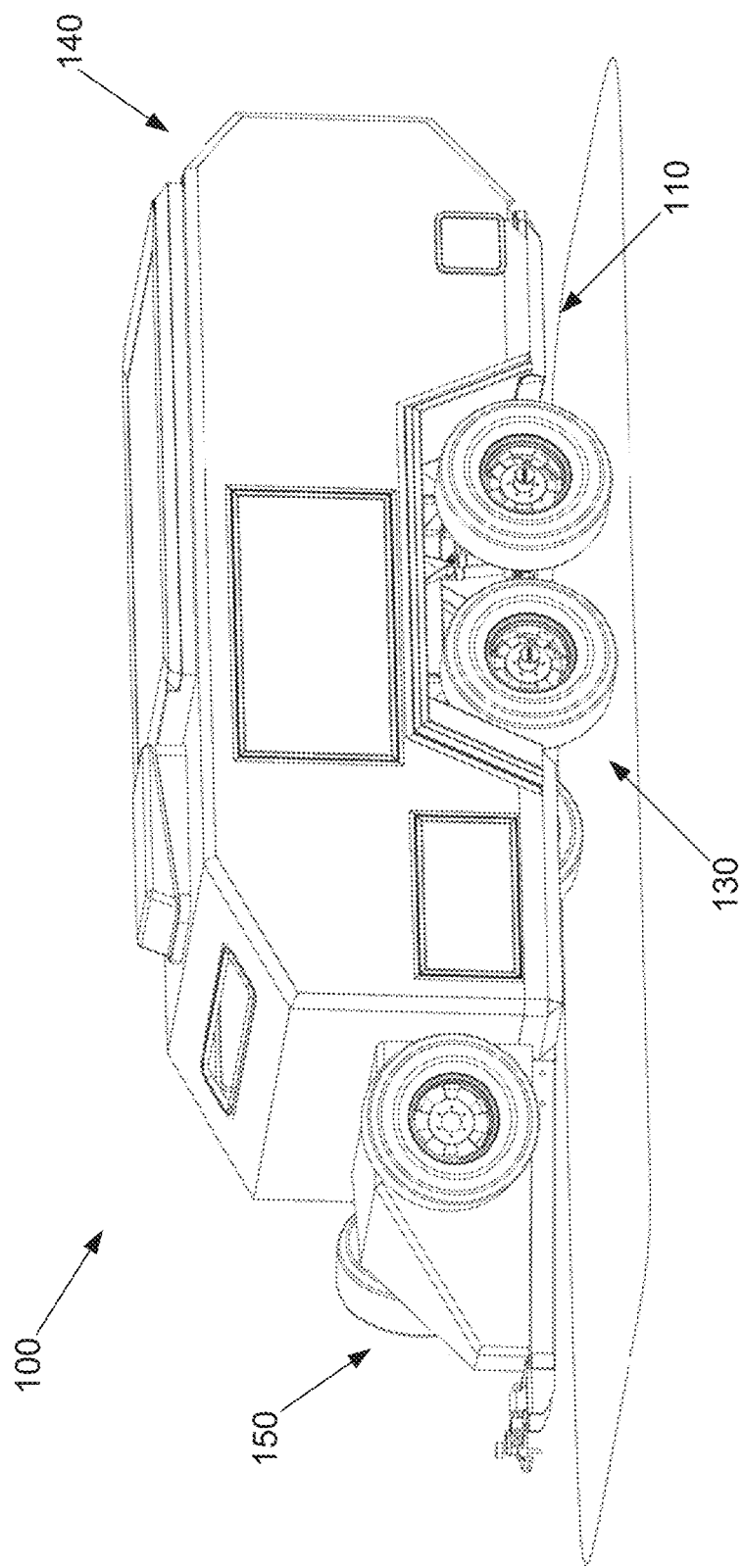
FIG. 1A is a schematic perspective view of an example of a towable vehicle with suspension in a retracted position.

An example of the towable vehicle will now be described with reference to FIGS. 1A to 1D.

For the purpose of this example, reference is made to a towable vehicle in the form of a caravan. However, it will be appreciated that aspects of the towable vehicle, such as the suspension assembly, are equally applicable to other forms of towable vehicle, such as trailers or the like and that reference to a caravan is for purpose of illustration only. Additionally, it will be appreciated that other aspects, such as the scissor lift mechanism can have applications beyond towable vehicles and again reference to the use in respect of a towable vehicle are for the purpose of illustration only and are not intended to be limiting.

In this example, the towable vehicle 100 includes a chassis 110 and wheels 130, each of which is coupled to the chassis via a respective suspension assembly 120. In this example, the towable vehicle includes four wheels 130 with two wheels being mounted longitudinally spaced on each lateral side the towable vehicle 100. This is not however intended to be limiting and it will be appreciated that a towable vehicle 100 including two or more wheels 130 could be provided.

In this example, the towable vehicle further includes a body 140, which in the case of a caravan forms the living section, and an accessories housing 150, for storing accessories and equipment, as well as providing a mounting point for spare wheels or the like.

Figure 1B:
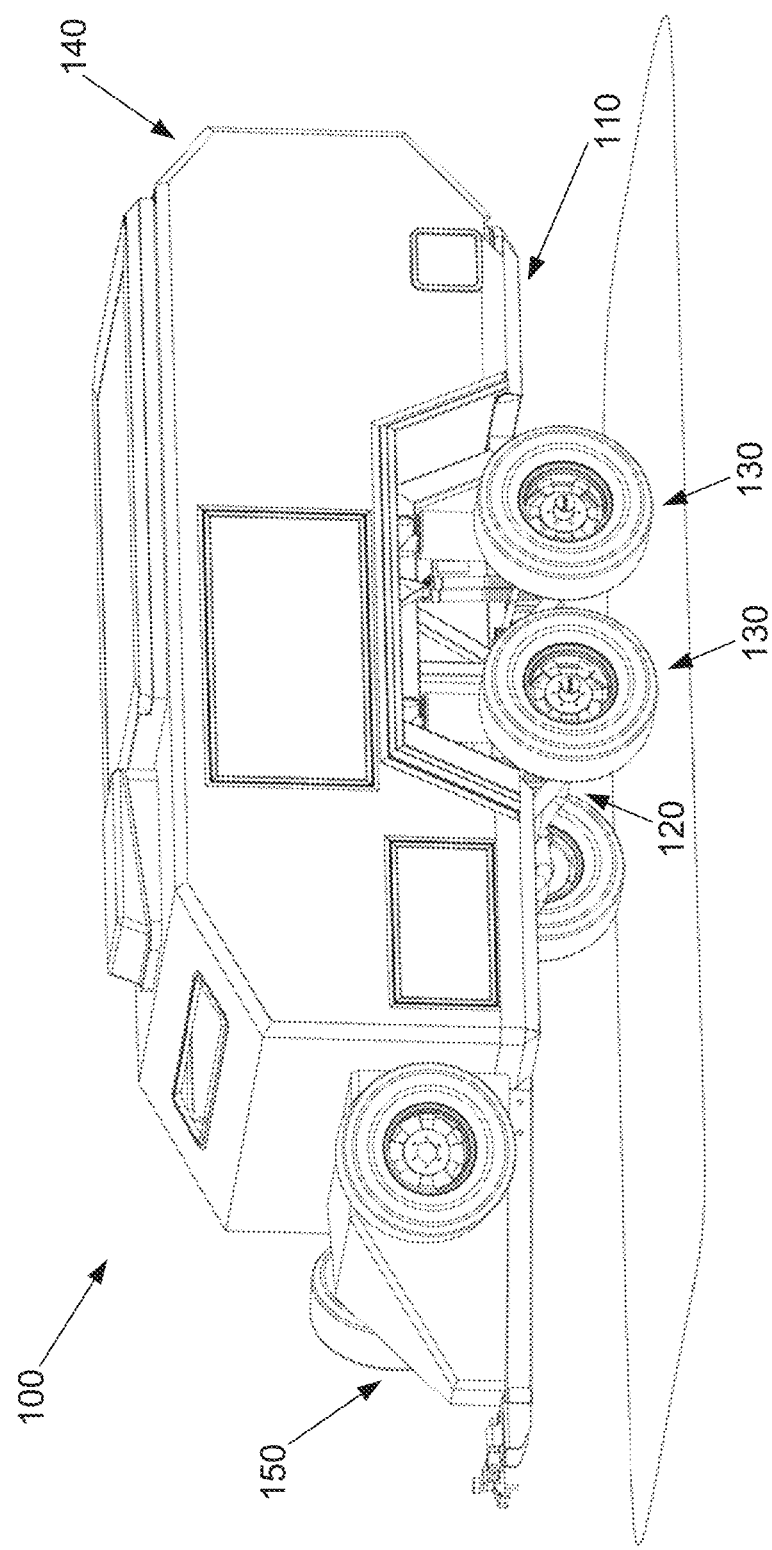
FIG. 1B is a schematic perspective view of the towable vehicle of FIG. 1A with the suspension in an extended position.
Figure 1C:
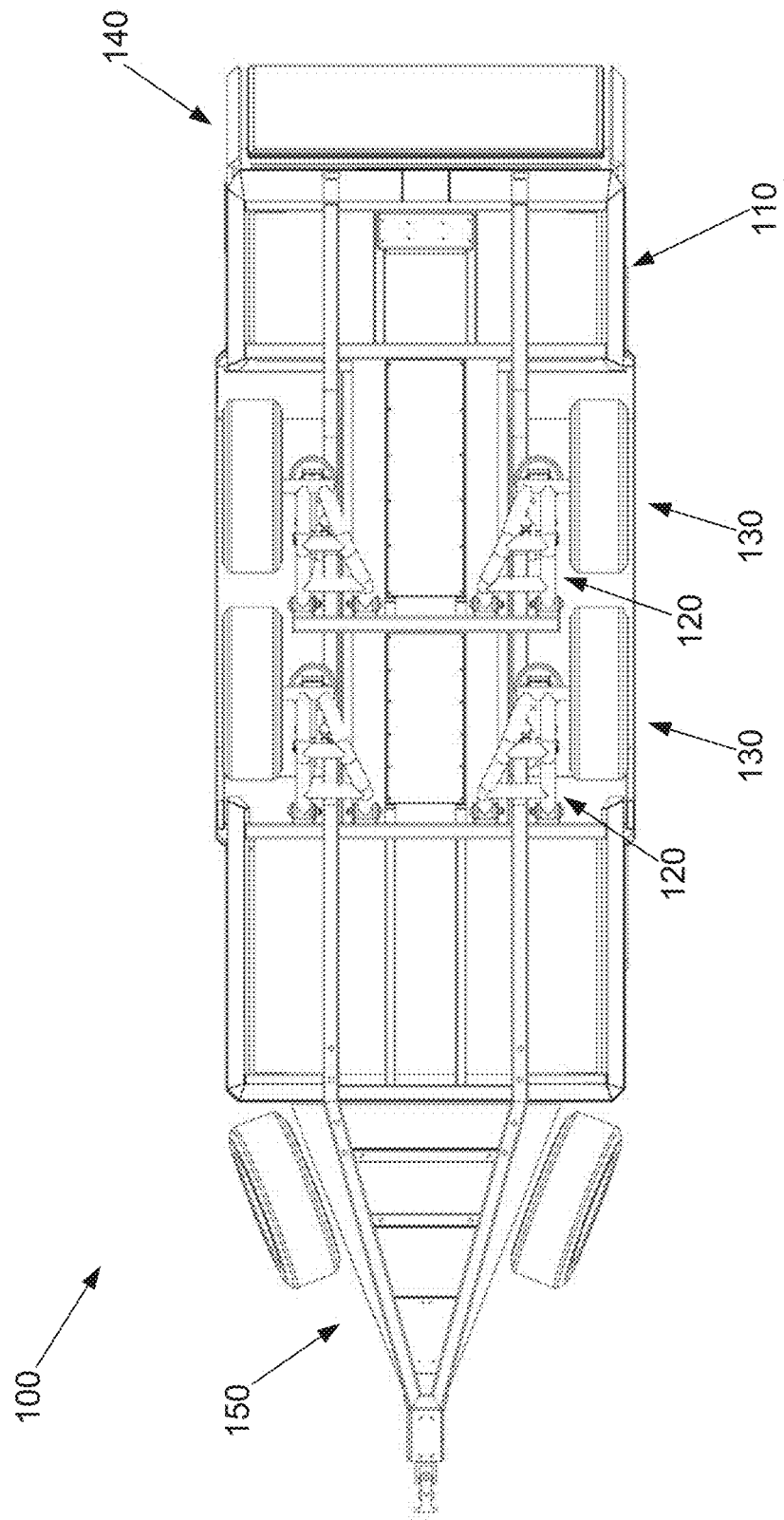
FIG. 1C is a schematic underside view of the towable vehicle of FIG. 1A.
Figure 1D:
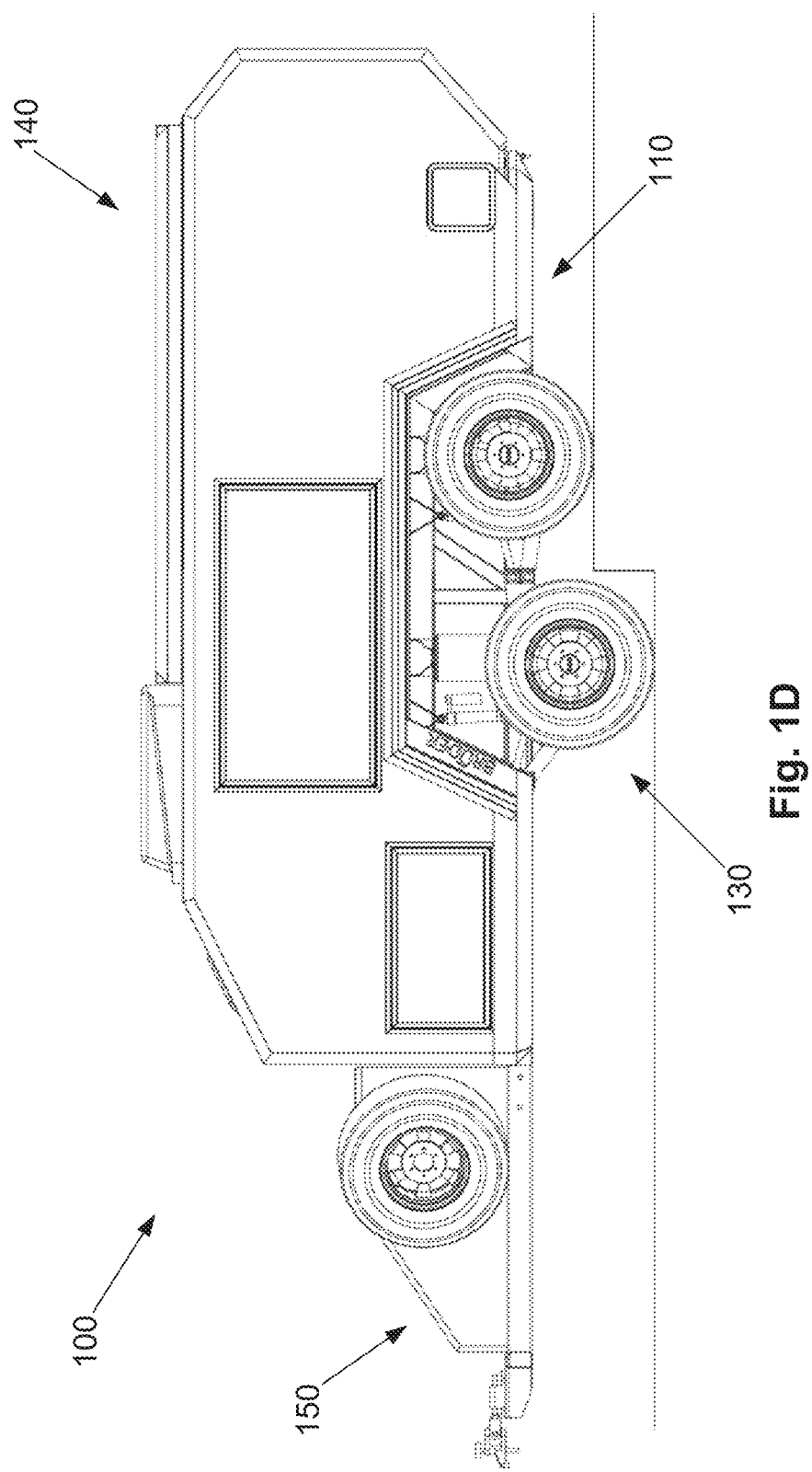
FIG. 1D is a schematic side view of the towable vehicle in FIG. 1A with the suspension in retracted and extended positions.

Each suspension assembly 120 allows a position of a corresponding wheel 130 to be controlled, in particular, allowing the wheels 130 to be moved between retracted and extended positions shown in FIGS. 1A and 1B. The wheels 130 can be moved independently and/or in conjunction, for example to raise one wheel 130 as another is lowered, to thereby assist in scaling obstacles, as shown in FIG. 1D. Movement of each of the wheels 130 can be controlled automatically based on signals from sensors and/or manually, in accordance with user inputs as will be described in more detail below.

Figure 2A:
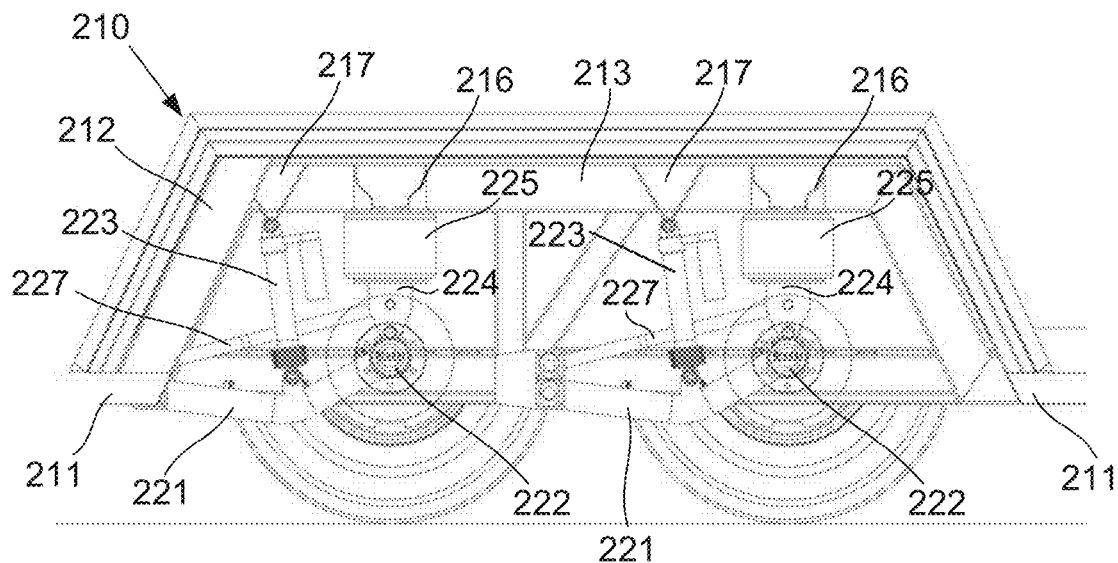
FIG. 2A is a schematic side view of an example of a suspension assembly in a retracted position.
Figure 2B:
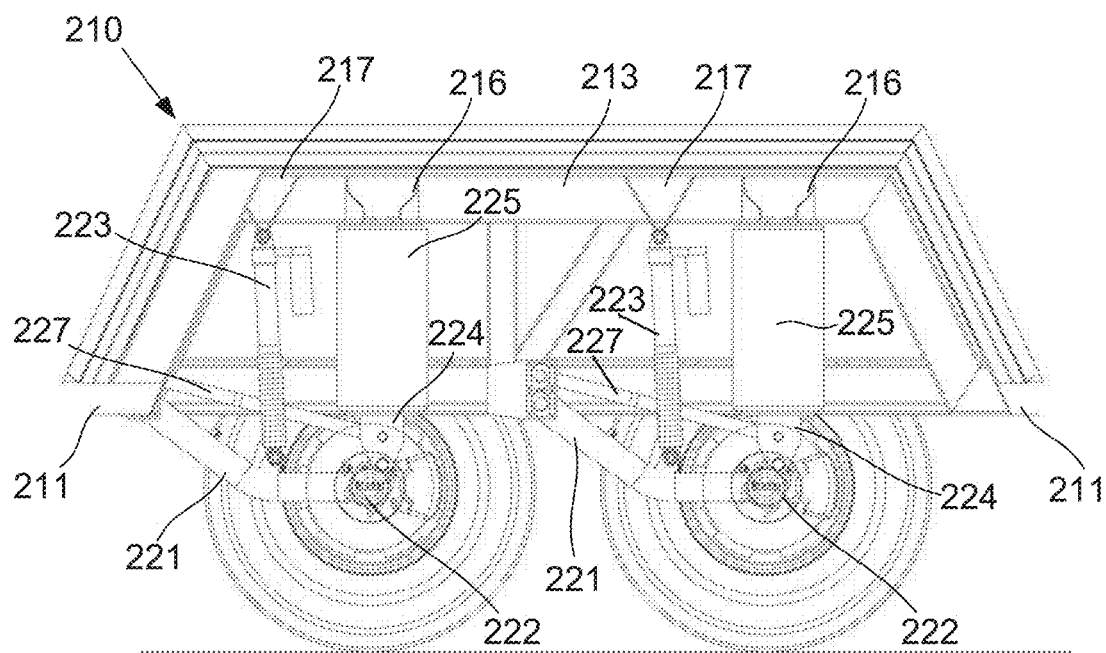
FIG. 2B is a schematic side view of an example of a suspension assembly in an extended position.
Figure 3A:
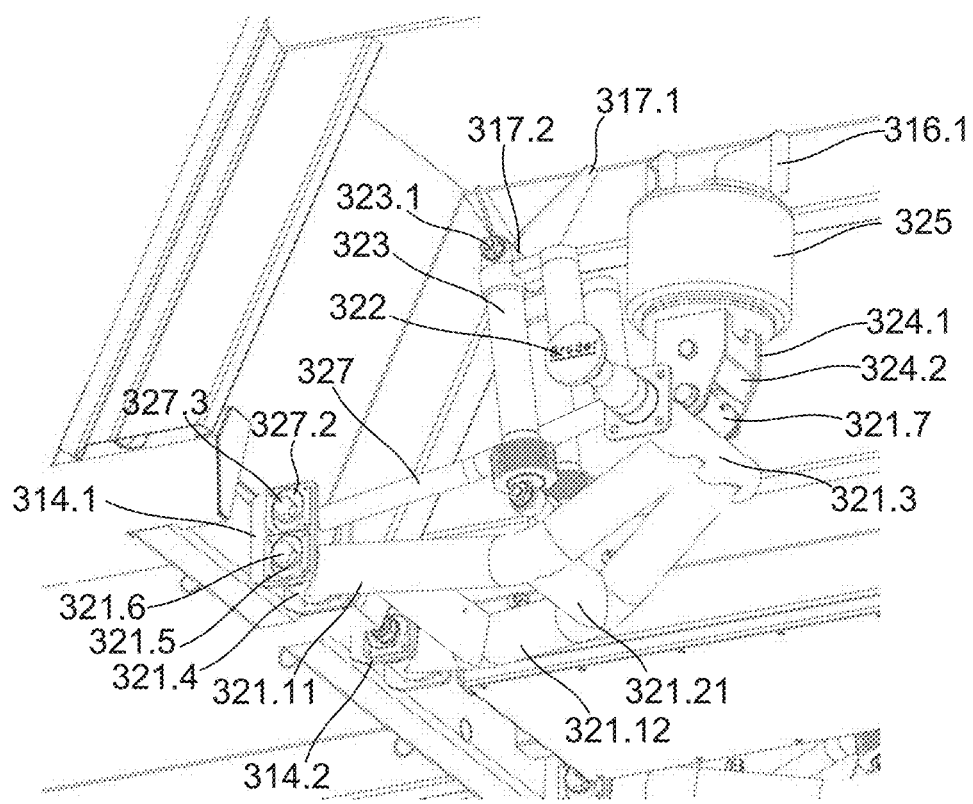
FIG. 3A is a schematic perspective underside view of the suspension assembly of FIG. 2A in a retracted position.
Figure 3B:
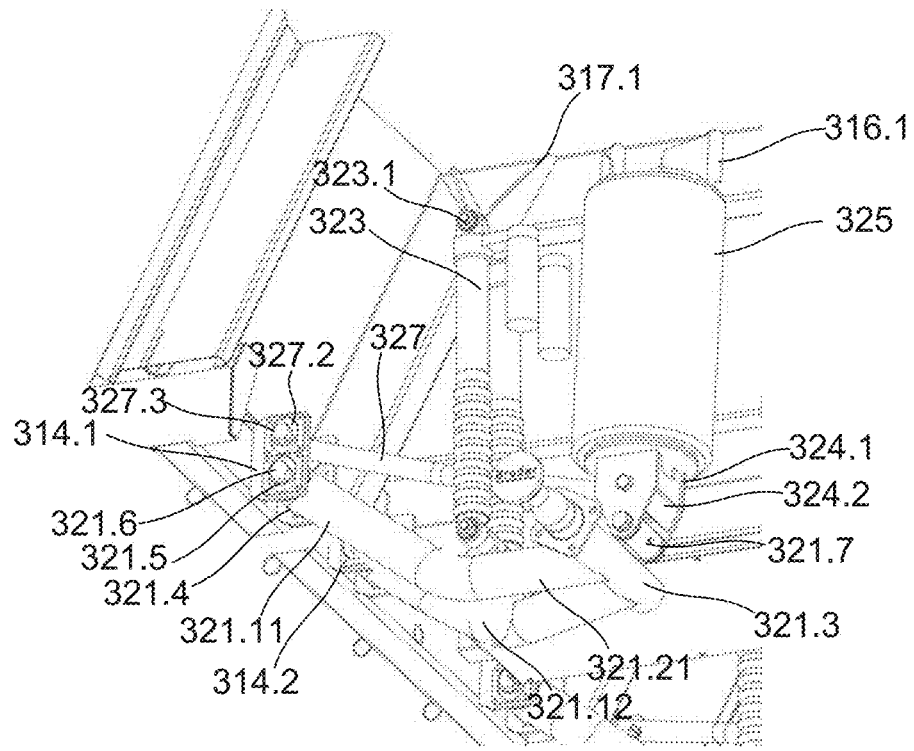
FIG. 3B is a schematic perspective underside view of the suspension assembly of FIG. 2A in an extended position.
Figure 3C:
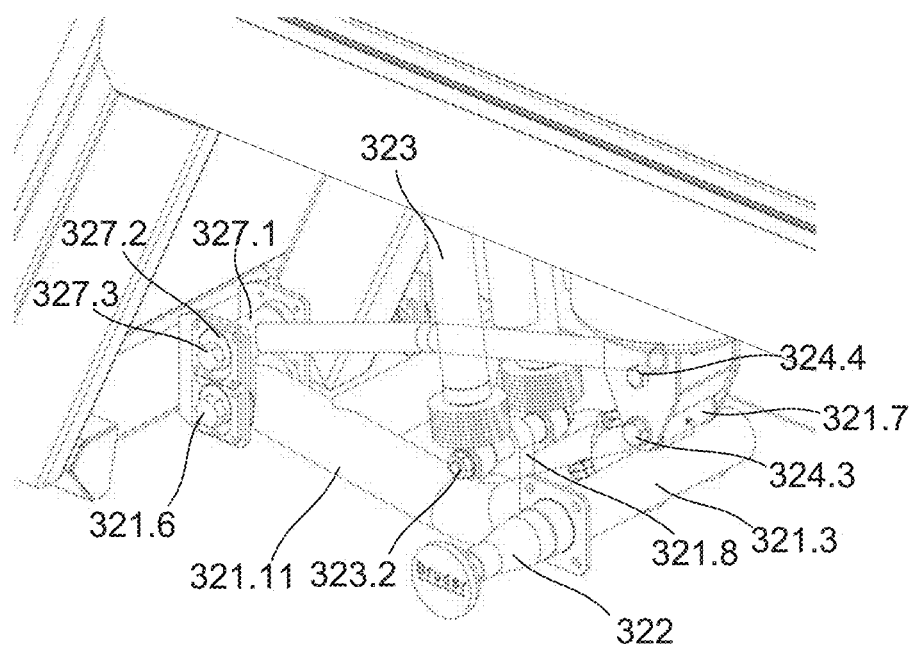
FIG. 3C is a schematic perspective top view of the suspension assembly of FIG. 2A in a retracted position.
Figure 3D:
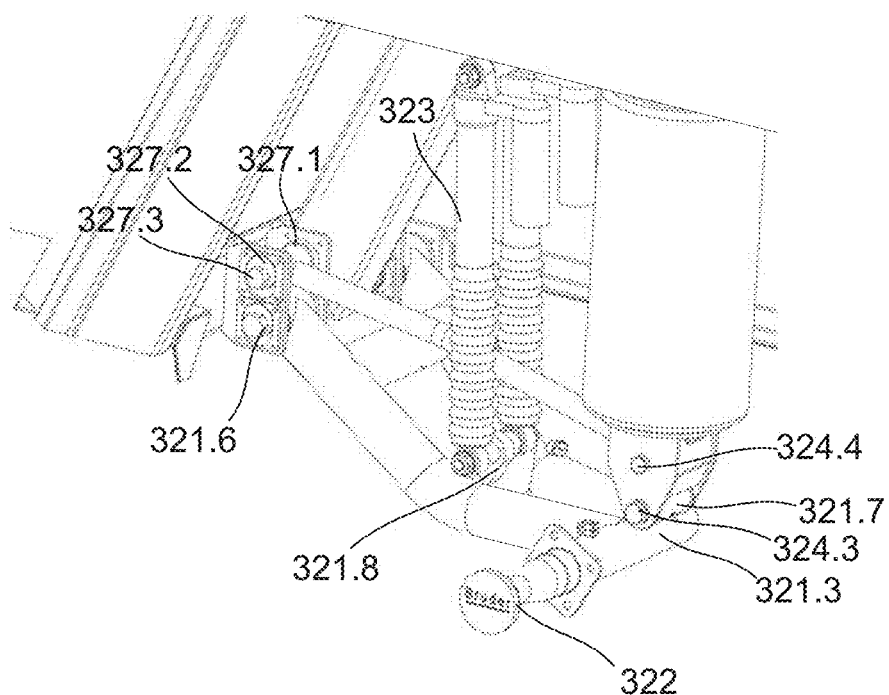
FIG. 3D is a schematic perspective top view of the suspension assembly of FIG. 2A in an extended position.
Figure 3E:
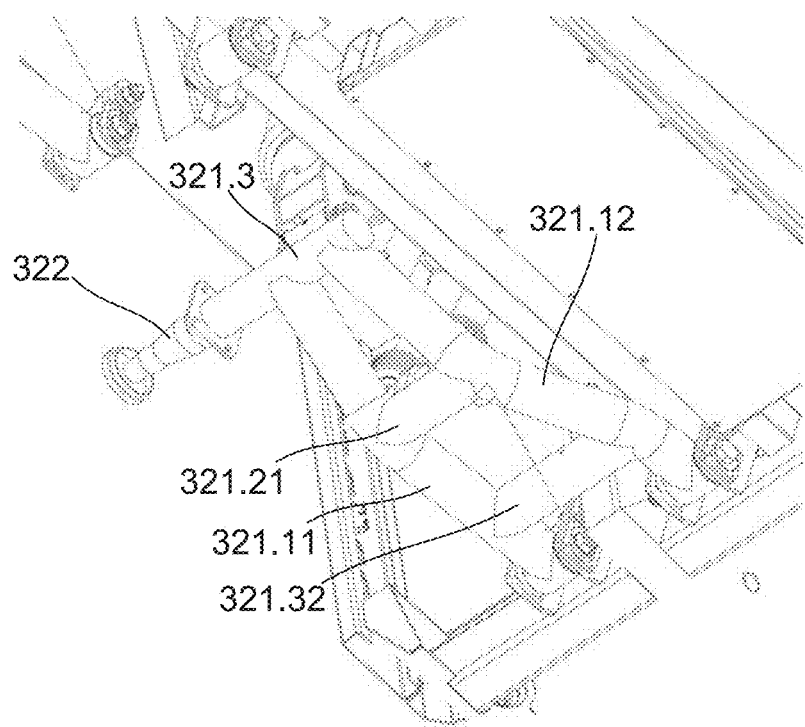
FIG. 3E is a second schematic perspective underside view of the suspension of FIG. 2A in a retracted position.
Figure 3F:
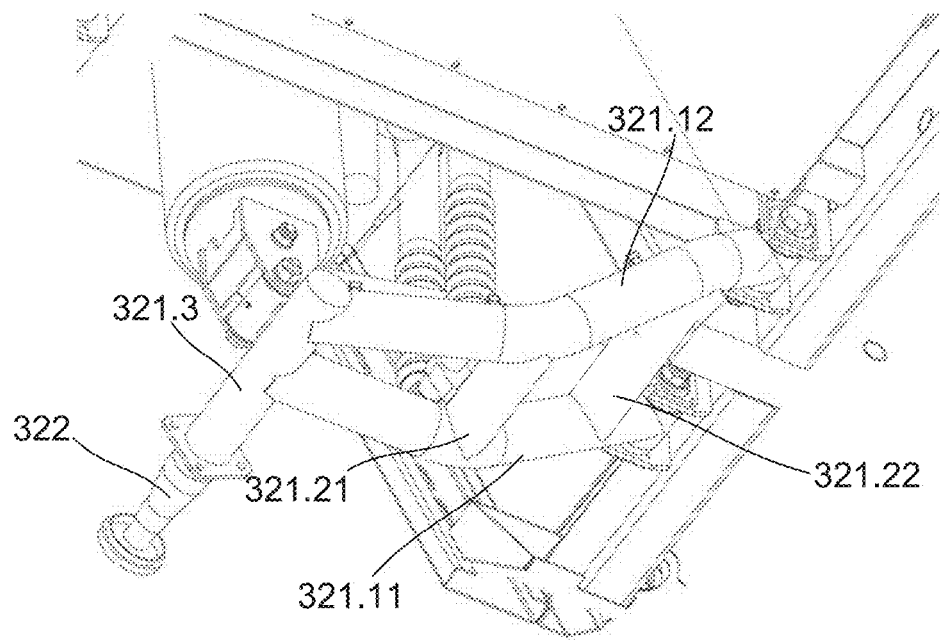
FIG. 3F is a second schematic perspective underside view of the suspension assembly of FIG. 2A in an extended position.

The construction of the suspension assembly will now be described with reference to FIGS. 2A and 2B.

In this example, the suspension assembly 120 includes a swing arm 221 that is pivotally mounted to the chassis 210. An axle 222 is mounted proximate a free end of the swing arm 221, allowing a wheel 130 to be mounted on the axle 222, with pivotal movement of the swing arm 221 adjusting the position of the wheel 130.

The suspension assembly 120 further includes an airbag swing arm mounting 224 pivotally coupled to the swing arm 221 and an airbag chassis mounting 216 coupled to the chassis 210. An airbag 225 is provided coupled to the airbag swing arm mounting 224 and the airbag chassis mounting 216, such that inflation and deflation of the airbag 225 can be used to move the swing arm 221 between extended and retracted positions, as shown in FIGS. 2A and 2B.

A pivot arm 227 is provided which is pivotally mounted to the chassis 210 and the airbag swing arm mounting 224 to thereby maintain an orientation of the airbag swing arm mounting 224 as the swing arm 221 moves between extended and retracted positions.

The presence of the pivot arm 227 ensures the airbag swing arm mounting 224 and airbag 225 are aligned as the swing arm 221 moves throughout the operating range, whilst also preventing free movement of the airbag swing arm mounting 224 that would otherwise occur due to the deformable nature of the airbag.

At least one shock absorber 223 is also typically provided, extending from the chassis 210 to the swing arm 221, to damp movement of the swing arm 221, as normally required in suspension systems. The shock absorber is pivotally coupled to the swing arm 221 and a shock absorber chassis mounting 217 coupled to the chassis 210.

The above described arrangement therefore allows an airbag supported suspension assembly to be implemented with a significant operating range. In one example, this can be used to achieve over 300 mm (12 inches) of wheel travel, more than double that of traditional suspension assemblies. Furthermore, throughout this range of motion, the suspension assembly and in particular the orientation of the airbag and airbag swing arm mounting are maintained ensuring effective operation of the airbag. This reduces stresses on the airbag, which in turn can assist in extending airbag lifespan and reduce the likelihood of airbag failure. Additionally, this allows the suspension to operate using the airbag only, for example in the case of shock absorber failure.

A number of further features will now be described.

In one example, the pivot arm 227 and/or the swing arm 221 are adjustable to adjust an orientation of the airbag swing arm mounting and/or control forces, such as a degree of tension or compression, in the pivot arm.

In this regard, the pivot arm 227 and swing arm 221 are typically coupled to the chassis 210 with pivot points that are substantially aligned on a vertical axis. The pivot arm 227 is positioned above and substantially parallel to the swing arm 221, which in conjunction with a vertical orientation of the airbag swing arm mounting 224 provides a substantially parallelogram arrangement to thereby maintain orientation of the airbag swing arm mounting 224 during pivotal movement of the swing arm 221. Nevertheless, this can result in significant forces being transmitted through the pivot arm 227 due to the significant degree of motion of the swing arm 221 as the suspension moves between retracted and extended positions. Allowing the swing arm 221 or pivot arm 227 to be adjusted can be used to minimise the maximum magnitude of forces in the pivot arm 227, which in turn reduces the likelihood of pivot arm failure, whilst minimising the required strength and hence weight of pivot arm required.

Additionally, providing adjustable swing or pivot arms can be used to adjust the orientation of the airbag swing arm mounting 224, to ensure this is aligned with the airbag 225.

In one example, adjustment is achieved by adjusting a length of the pivot arm 227. Alternatively, and more preferably, a pivot position of the pivot arm 227 and/or swing arm 221 are adjustable, for example by mounting the pivot and/or swing arms using an eccentric cam, as will be described in more detail below.

The pivot arm 227 and/or swing arm 221 can be adjusted based on the operating range so that forces within the pivot arm 227 are acceptable over the entire operating range. It will therefore be appreciated with such an arrangement the suspension assembly is typically configured as part of a set up procedure prior to use of the towable vehicle. However, this is not essential and alternatively, the adjustment could be performed dynamically for example by having a powered adjustment system which adjusts based on the degree of extension of the suspension assembly.

Further adjustment of the airbag orientation can also be achieved by mounting the airbag to an airbag cam provided in an airbag cam mounting on the chassis so that rotation of the cam adjusts the position, and in particular the longitudinal position, of the airbag 225. As previously described, correct orientation of the airbag 225 and airbag swing arm mounting 224 can assist in prolonging life of the airbag, allow the suspension to continue to operate in the event of shock absorber failure, and allow for a greater effective operating range.

A variety of different airbag and shock absorber configurations can be used. In one example, the airbag is mounted substantially above the axle, with shock absorbers being mounted forwardly or rearwardly of the airbag. However, this is not essential, and alternatively the shock absorbers could be mounted above the axle, with the airbag mounted forwardly or rearwardly of the shock absorbers. These different arrangements provide different characteristics, such as a different operating range, different degree of dampening, or the like, thereby providing different suspension characteristics, which can be selected based on the particular requirements of the towable vehicle.

In one example, the suspension assembly includes two laterally spaced interconnected swing arms supporting the axle, which can assist in accommodating torsional stresses. In this instance, the suspension assembly can include two laterally spaced shock absorbers, one for each swing arm, in which case the pivot arm may be laterally curved to pass between the laterally spaced shock absorbers.

In the above example, to facilitate mounting of the suspension assemblies, the chassis 210 includes a base section 211 and an elevated section 213, interconnected via a sloped supporting section 212. The swing arm 221 and pivot arm 227 are connected to the base section 211, whilst the shock absorber 223 and airbag 225 are attached to the elevated section. It will be appreciated that this arrangement allows a significant range of movement to be obtained, and specifically allows the suspension assembly to be retracted until the base section 211 of the chassis is close to the ground, thereby facilitating access to the towed vehicle. However, this is not essential and alternative arrangements could be used.

A specific example of a suspension assembly will now be described in further detail with reference to FIGS. 3A to 3F. Features similar to those shown in FIGS. 2A and 2B are denoted with similar reference numerals increased by 100.

In this example, the swing arm 321 typically includes two laterally spaced swing arms 321.11, 321.12 which are interconnected via lateral supporting members 321.21, 321.22 to thereby provide structural strength and resist torsional forces. An axle hub 321.3 is provided extending laterally at the free ends of the two swing arms 321.11, 321.12, thereby supporting a wheel axle 322 in use. The swing arms 321.11, 321.12 are downwardly curved so that a centre of the swing arm is lower than each end (except when in the fully extended position). This ensures that the axle 322 is higher than the lowest point of the swing arm 321, which prevents the axle 322 catching on the ground when the towable vehicle is navigating undulating terrain. This also allows the vehicle to be dragged on the swing arm 321 in the event of wheel failure, as well as allowing the vehicle to be dragged or towed rearwardly, for example when removing the towable vehicle from bogged situations, without the axle 322 catching on the ground.

First ends of the laterally spaced swing arms 321.11, 321.12 include swing arm hubs 321.4 that receive a swing arm axle 321.6 extending therethrough to thereby pivotally mount the swing arms 321.11, 321.12 to respective brackets 314.1, 314.2. Each of the brackets 314.1, 314.2 typically include laterally spaced bracket plates, allowing the swing arm axle 321.6 to extend therethrough so that this is supported at each end. An eccentric swing arm cam 321.5 is seated in first openings within each bracket 314.1, 314.2 so that a swing arm axle position, and hence swing arm pivot position can be adjusted.

Similarly, the brackets 314.1, 314.2 further include second openings positioned above the first openings, for allowing the pivot arm 327 to be attached thereto. In this regard, the pivot arm 327 includes a pivot arm hub 327.1 provided at a first end, which receives a pivot arm axle 327.3 which is mounted on a pivot arm cam 327.2, allowing the pivot location of the pivot arm 327 to be adjusted.

A swing arm airbag mounting hub 321.7 is positioned on an upper surface of the axle hub 321.3, whilst a pivot arm airbag mounting hub (not shown) is provided on a second end of the pivot arm, allowing the airbag swing arm mounting to be attached thereto. The airbag swing arm mounting includes laterally spaced side plates 324.1 having an irregular pentagonal shape, with upper rectangular sections coincident with a lower isosceles triangle, interconnected by rectangular end plates 324.2. Axles 324.3, 324.4 extend through the side plates 324.1 to couple the swing arm mounting to the swing arm airbag mounting hub 321.7 and pivot arm airbag mounting hub, respectively.

The airbag 325 is attached to a generally rectangular upper surface of the airbag swing arm mounting, for example using an airbag mounting plate. An upper end of the airbag is attached via an airbag mounting plate, to an airbag chassis mounting 316, which includes curved fins 316.1 extended outwardly from the elevated section of the chassis and a baseplate (not shown) extending between lower ends of the fins 316.1, allowing the airbag mounting plate to be attached thereto. The airbag mounting plate is attached to the baseplate via fasteners mounted in cams within openings in the baseplate, allowing a longitudinal position of the airbag mounting to be adjusted.

The shock absorbers 323 are pivotally mounted to a shock absorber chassis mounting 217, which includes fins 317.1 extending laterally from the elevated section of the chassis to support a chassis shock absorber hub 317.2. An axle extends through the hub 327.2 pivotally mounting the shock absorbers to the shock absorber chassis mounting 217. The shock absorber 323 is further coupled via an axle 323.2 to a swing arm shock absorber hub 321.8 extending upwardly from a mid one of the lateral supporting members 321.21.

In this example, laterally spaced shock absorbers 323 are provided, with the pivot arm 327 being curved allowing this to pass between the shock absorbers 323.

As previously described, in one example the towable vehicle can include a body, for example allowing this to act as a caravan, a storage vehicle for storing drones or other equipment, or the like.

Typically, in these situations, the body is a rigid self-contained body mounted to the chassis via a number of body mountings. In one example the body mountings include an elastically deformable member, such as a spring or a component formed from a resilient material such as rubber, to absorb forces between the chassis and body. This allows the body to be a self-supporting structural body, as opposed to requiring that the body is a shell that is structurally supported by the chassis, as is the case with traditional caravan arrangements. This latter traditional arrangement suffers from the drawback that forces on the chassis are transmitted through the shell, making this prone to damage. For example, torsion of the chassis, as might arise in off-road travel or impacts, is transmitted through the shell, leading to damage, such as fracturing. In contrast, in the current arrangement such forces are absorbed by the body mountings, thereby avoiding such damage.

To achieve this arrangement, the body is typically made of a number of interconnected rigid body panels. The panels can be made of structural insulated panels, typically consisting of an expanded polystyrene foam (EPS), extruded polystyrene foam (XPS), polyisocyanurate foam, polyurethane foam or composite honeycomb (HSC), or the like, optionally provided with a skin that provides a rigid outer covering. In one example, the panels are constructed from 28 mm Divinycell MX7.7 with 800 QX-E glass skins for a total thickness of 30 mm.

In one example, the panels include bevelled or chamfered edges, so that panels can abut to form mitre joints. Whilst this is not essential, and alternatives such as butt joints could be used, the use of mitre joints is beneficial as this provides additional strength. In particular, in this configuration the inner and outer skins of adjacent panels abut, and are bonded, effectively forming contiguous inner and outer skins. As the skins provide a significant portion of the overall panel strength, this in turn helps maximise overall strength of the body.

The panels can be joined using a variety of techniques, such as adhesive bonding along panel edges, as well as the use of additional bonding across the join. For example, joins could be covered with a silicone sealant, which adds strength and prevents ingress of water through the join. Additionally, the join can be covered with internal or external joining plates spanning the join. These plates can be made of aluminium and/or plastic, and could include fibre reinforced plastics, such as cross-linked polyethylene (PEX) members, attached to inside or outside surfaces of the panels. The use of such joining plates can provide additional structural strength and assist in preventing ingress of water. Such a configuration has good structural and thermal properties. For example, this can be contrasted to traditional caravans in which upright metal support posts are attached to the chassis to support the shell, allowing thermal transfer through the support posts, making the caravan uncomfortable in hot or cold weather.

An example of a caravan will now be described in more detail with reference to FIGS. 4A to 4E.

Figure 4A:
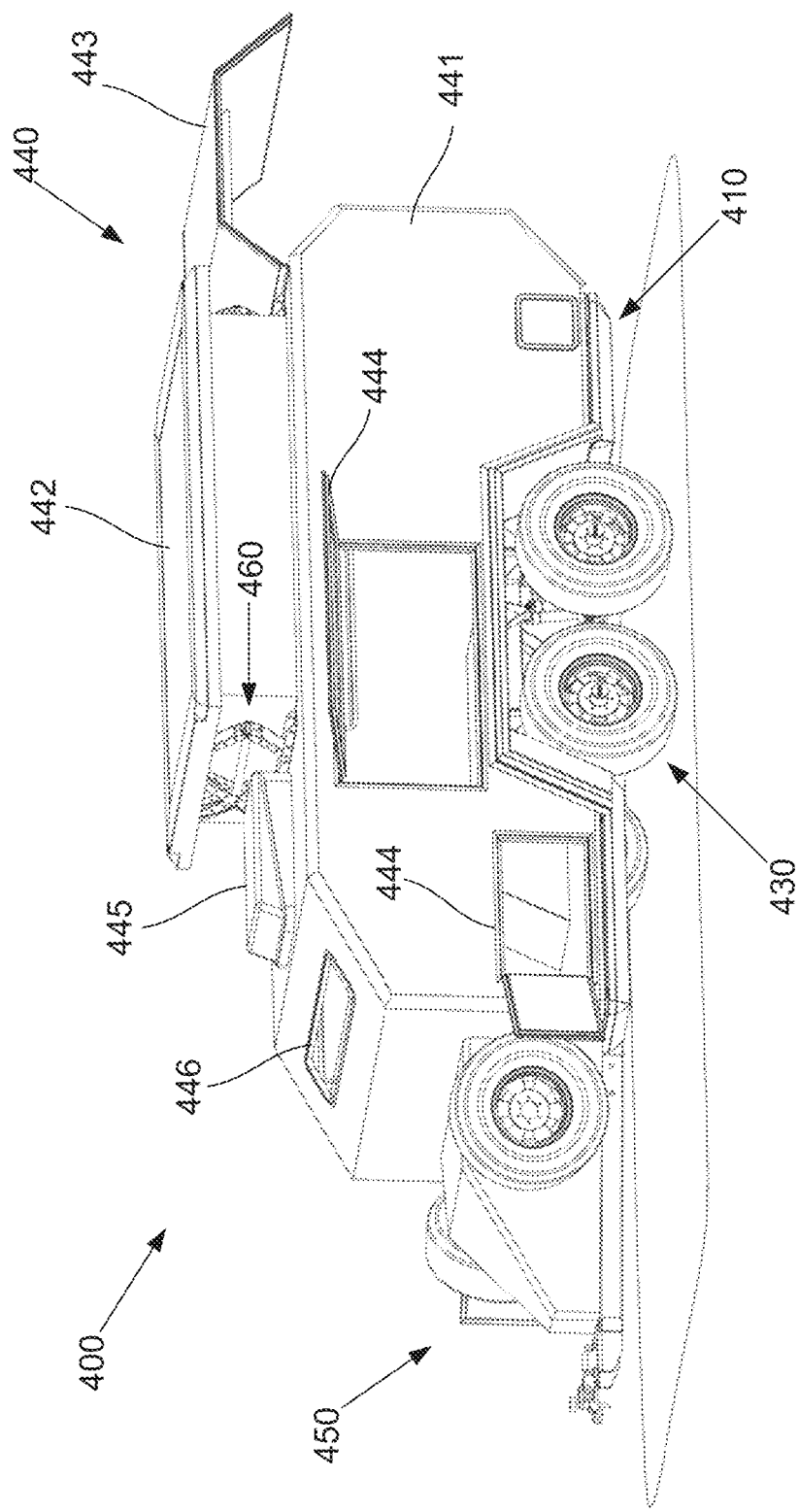
FIG. 4A is a schematic perspective view of an example of a caravan.
Figure 4B:
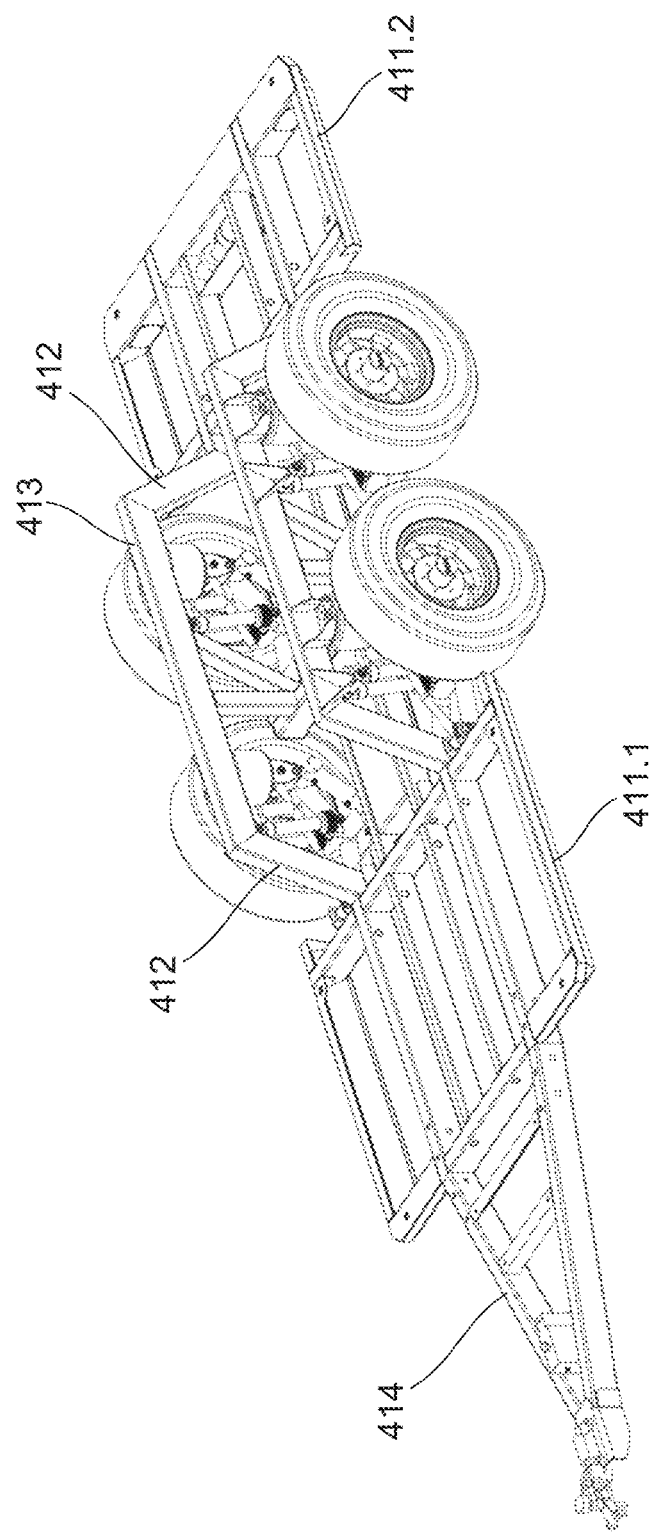
FIG. 4B is a schematic perspective top view of the chassis of the caravan of FIG. 4A.
Figure 4C:
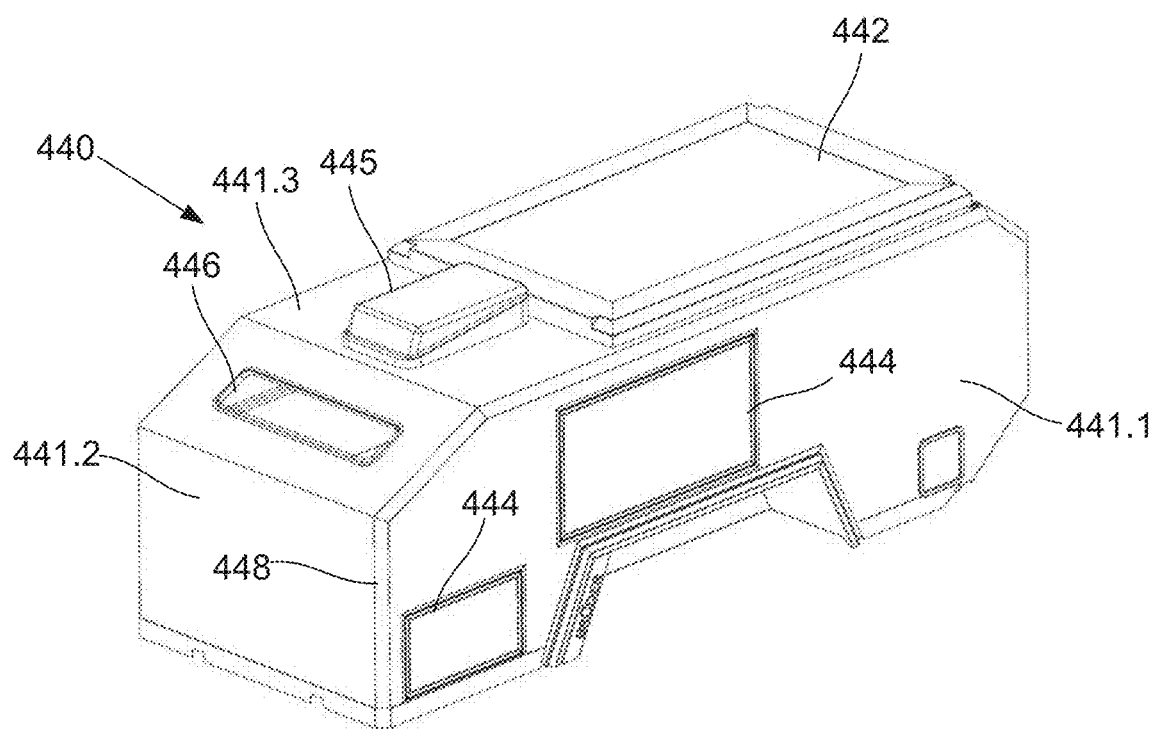
FIG. 4C is a schematic perspective top view of the body of the caravan of FIG. 4A.
Figure 4D:
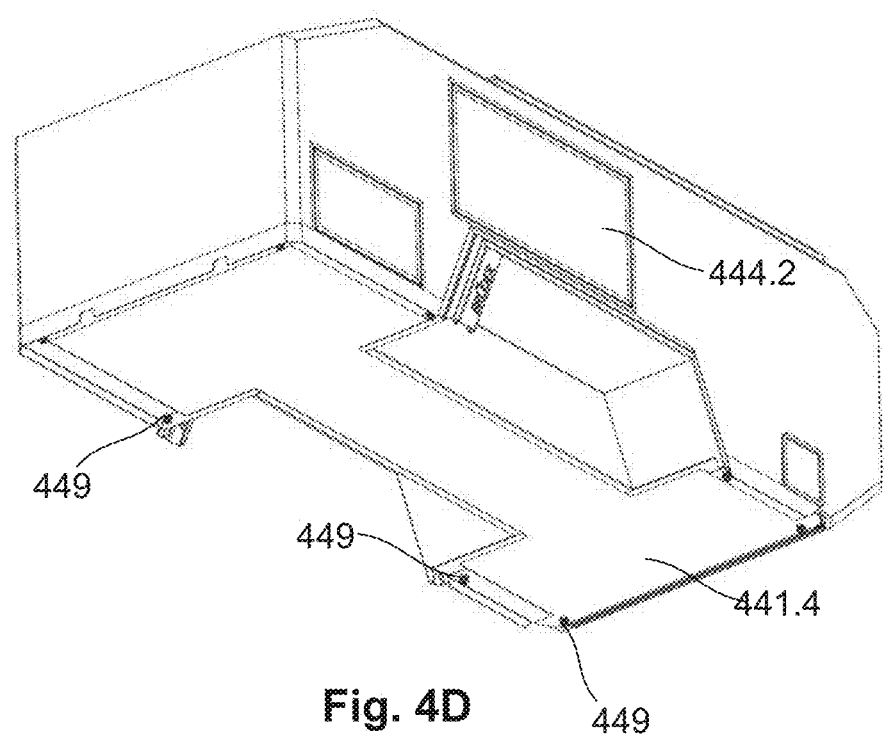
FIG. 4D is a schematic perspective underside view of the body of FIG. 4C.
Figure 4E:
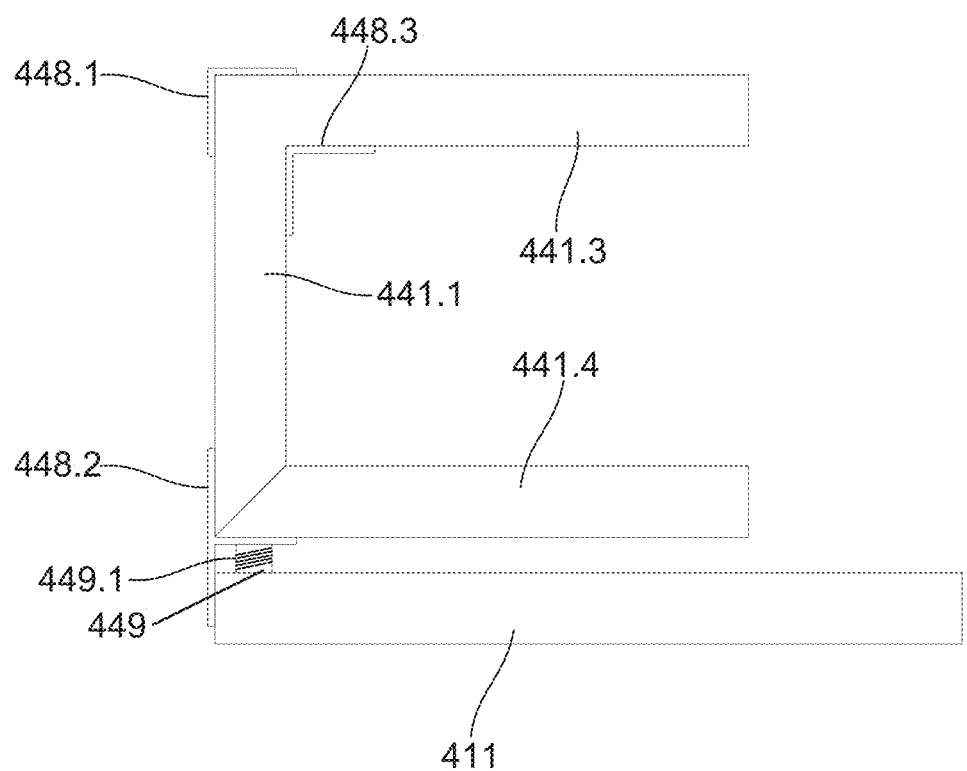
FIG. 4E is a schematic cut away side view of an example of part of the chassis and the body of the caravan of FIG. 4A.
Figure 5A:
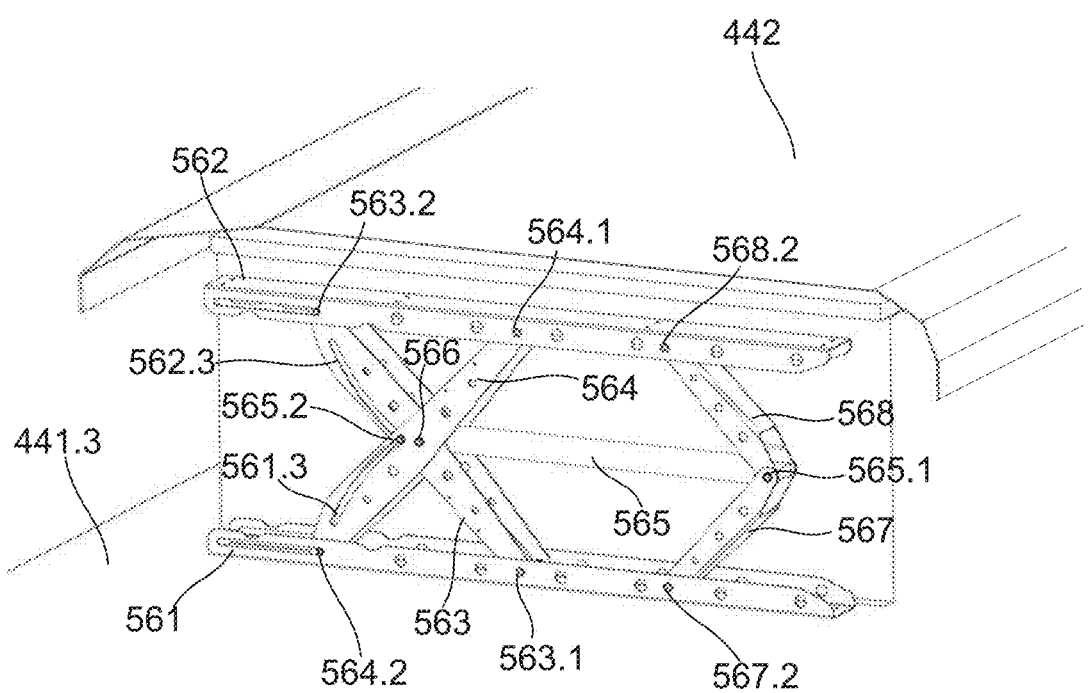
FIG. 5A is a schematic perspective top view of a scissor mechanism in an extended position.
Figure 5B:
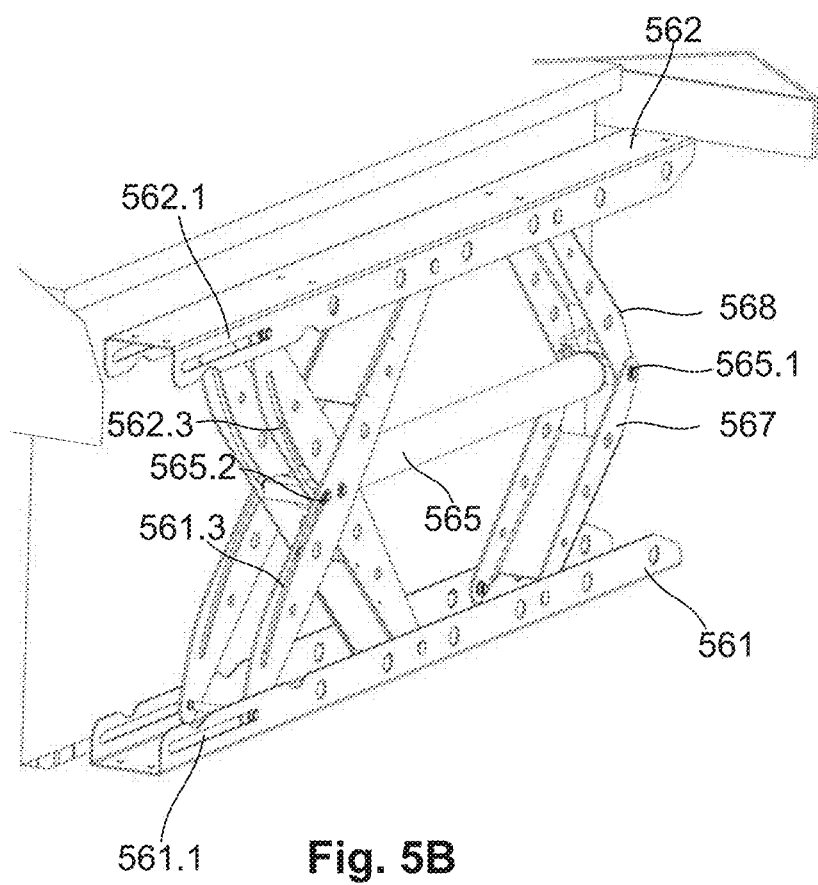
FIG. 5B is a second schematic perspective top view of the scissor mechanism of FIG. 5A.
Figure 5C:
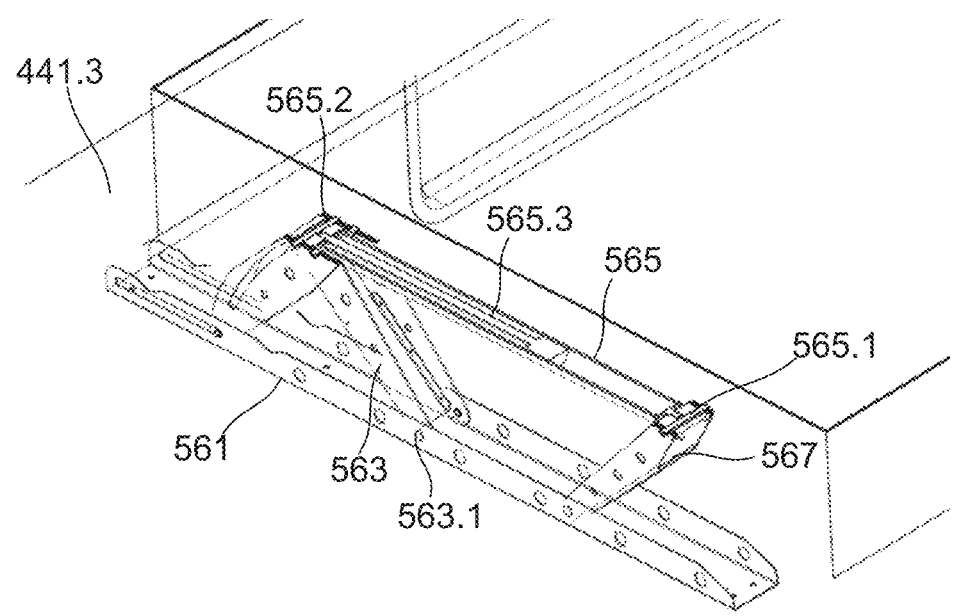
FIG. 5C is a schematic perspective cut away of the scissor mechanism of FIG. 5A.
Figure 5D:
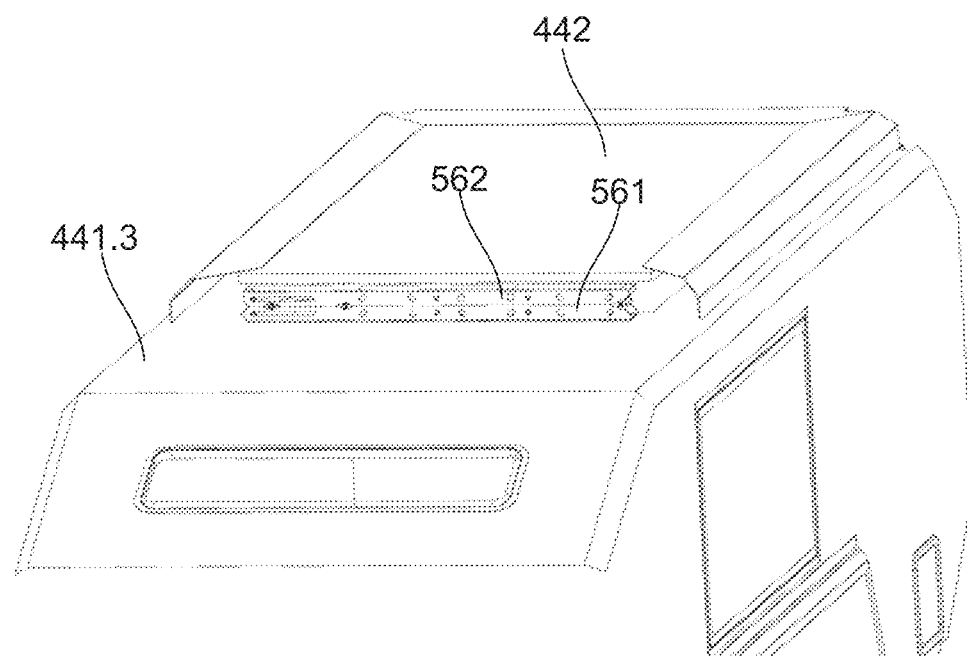
FIG. 5D is a schematic perspective top view of the scissor mechanism of FIG. 5A in a retracted position.
Figure 6A:
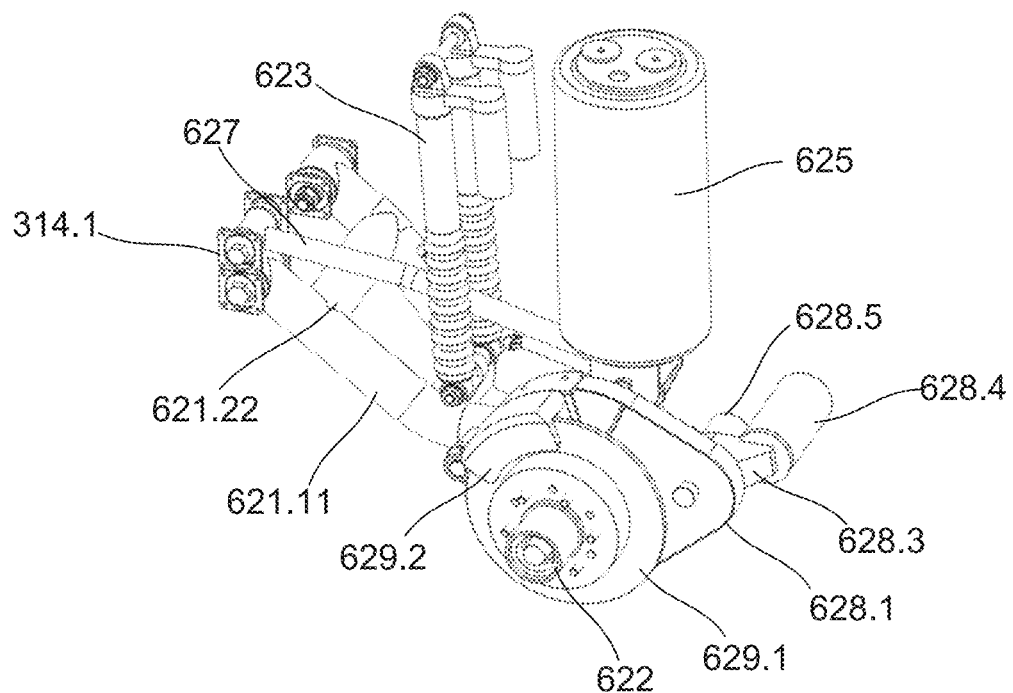
FIG. 6A is a schematic perspective view of a suspension assembly including a drive system.
Figure 6B:
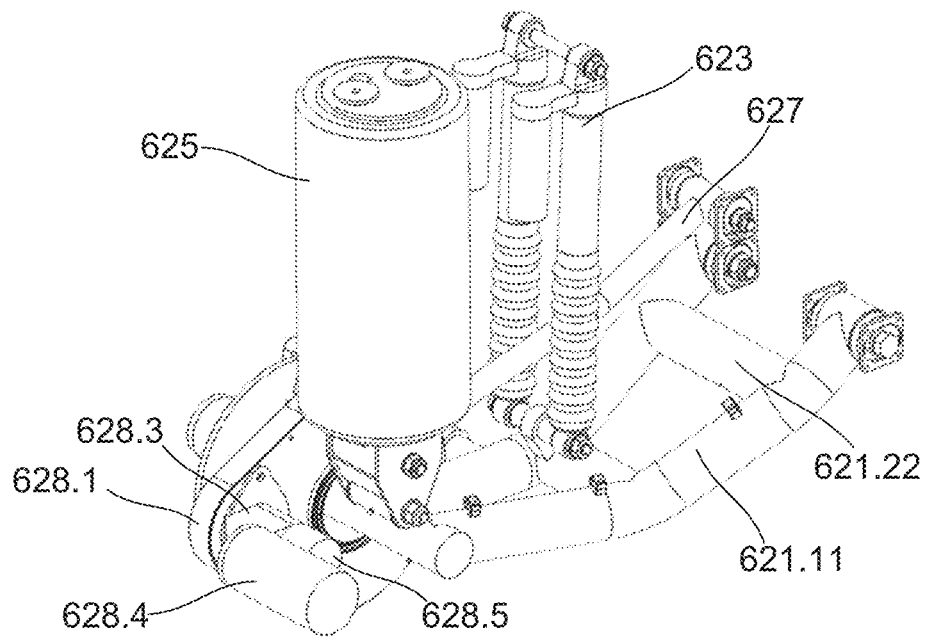
FIG. 6B is a schematic perspective rearside view of the suspension assembly of FIG. 6A.
Figure 6C:
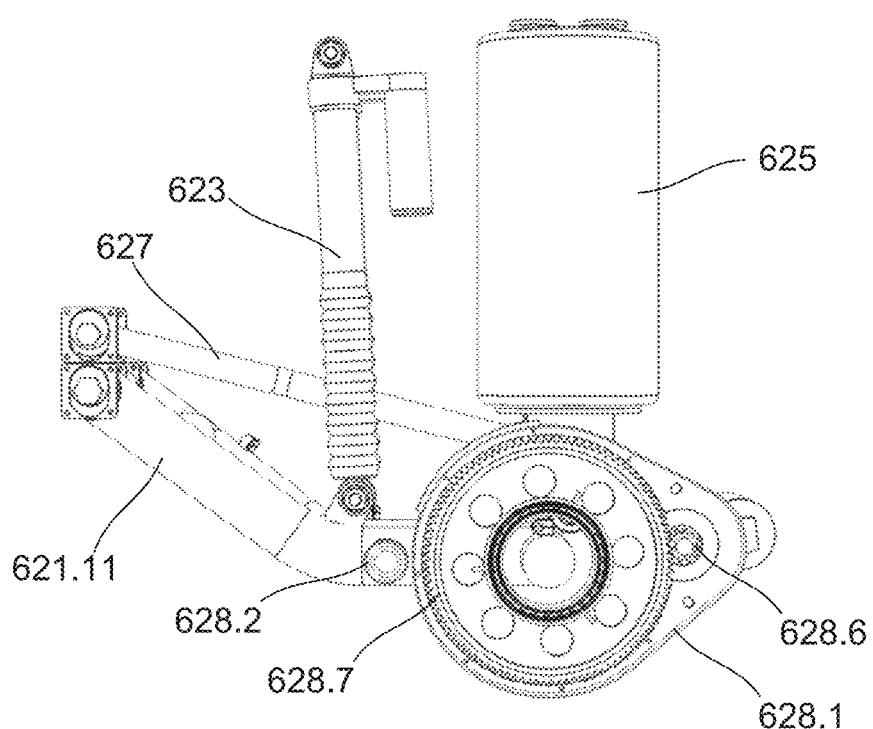
FIG. 6C is a schematic perspective cut away side view of the suspension assembly of FIG. 6A.
Figure 6D:
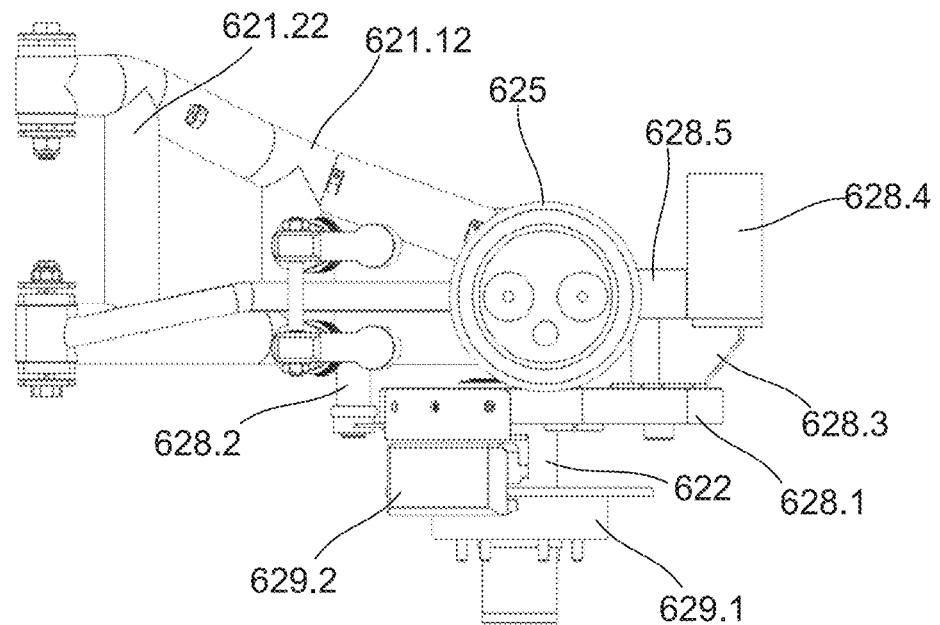
FIG. 6D is a schematic plan view of the suspension assembly of FIG. 6A.

In this example, the caravan includes a chassis 410, shown in FIG. 4B, and a body 440 shown in FIGS. 4C and 4D.

In this example, the chassis 410 includes a base section 411, including a grid of frame members. The base section 411 typically extends between front and rearward sections 411.1, 411.2. A central elevated section is formed from laterally spaced beams 413, supported in an elevated position by sloped beams 412 provided at either end. The elevated section 413 is used to support the suspension and airbag mountings thereby accommodating the suspension assembly whilst ensuring that the base sections 411.1, 411.2 are not elevated too high when the suspension is in a retracted position. This facilitates loading or unloading of the towable vehicle, for example allowing ingress of passengers to a caravan, or loading of a trailer. As shown in FIG. 4B the elevated sections 413 are laterally spaced, so that the base section 411 extends between the elevated sections 413 allowing passage of individuals there through.

The caravan body 440 includes a number of panels, including side wall panels 441.1, an end wall panel 441.2, a roof panel 441.3 and a base 441.4. A rear door 443 is provided to allow access to the inside of the caravan, with a number of openable hatches 444 being provided to act as windows or provide access. A roof section 442 is mounted within the roof panel, allowing this to be raised using a scissor lift mechanism 460, to provide additional internal space, whilst an air conditioning system cover 445 and front window 446 are also provided as shown.

Each of the panels 441 are structural insulated panels as described above, with the panels 441 including bevelled edges, allowing these to be connected using mitre joints. A fibre reinforced plastic joining member is bonded to panel inner surfaces 448.3, bridging the joint to hold the panels together, with outer joining panels 448.1, such as aluminium or plastic extrusions, overlaying each joint to provide additional structural strength and prevent water ingress.

The body 440 is typically self-supporting and mounted to the chassis 410 via body mountings 449 coupled to the base 441.4. The body mountings include an elastically deformable member 449.1, such as a compression spring, allowing for relative movement between the body and chassis. In some examples the body mountings may be formed from rubber or other suitable resilient materials. In any event, this can help absorb forces present in the chassis, such as torsional loads or the like without causing defamation of the caravan body. In this example, the outer joining panel 448.2 can be T-shaped to thereby cover the gap between the body 440 and chassis 410.

As mentioned above, a scissor lift mechanism can be used to raise the roof section 442. An example scissor mechanism is shown in more detail in FIGS. 5A to 5D.

In this example, the scissor lift mechanism includes a first rail 561 mounted to the body 410, and in particular the roof panel 441.3 and a second rail 562 mounted to the roof section 442.

A pair of scissor arms 563, 564 are provided with the first scissor arm 563 having a first end pivotally mounted to the first rail 561, typically via a pivotal mounting 563.1, and a second end slidably mounted to the second rail 562, for example by mounting a sliding pin 563.2 in a second rail slot 562.1. Similarly, the second scissor arm 564 has a first end pivotally mounted to the second rail 562 via a pivotal mounting pin 563.2 and a second end slidably mounted to the first rail 561 using a sliding pin 564.2 in a first rail slot 561.1. The first and second scissor arms are pivotally connected at a mid-point. A slot 561.3, 562.3 is provided in each scissor arm 563, 564 extending from the centre of each arm proximate the second end, to an inner edge of the arm proximate mid-point 566.

An actuator 565 is provided coupled to a biasing pin 565.2 mounted within the slots 561.3, 562.3 in each scissor arm 563, 564 so that movement of the biasing pin along the slot causes the scissor arms to pivot about the pivotal connection thereby moving the roof 442 relative to the roof panel 441.3.

In this arrangement, having the slot extend from a centre to an outer edge of the arm moving from the second end to the mid-point of the arm, this means the slot is angled relative to the direction of biasing of the biasing member, at least as the scissor arms are initially moved from their retracted position. This angling, referred to hereinafter as a ramp angle, helps provide a wedging action so that lateral movement of the biasing pin is converted into a pivotal movement of the scissor arms, thereby facilitating deployment of the arms. In particular, this reduces the force required to induce initial movement of the arms, thereby increasing the overall lifting capacity of the scissor lift mechanism for a given strength of actuator, which in turn helps minimise the size of the scissor lift required to lift a given weight.

This arrangement therefore provides a compact scissor lift mechanism ideally suited for use in a towable vehicle such as a caravan, in which space usage and weight are ideally minimised. However, it will be appreciated that the scissor lift mechanism can also be used more widely in other applications, for example to relatively move two bodies, in which case the function of the rails could be provided by suitable configuration of the bodies themselves.

A number of further features will now be described.

In one example, the slots 561.3, 562.3 are curved, in particular being curved towards the centre of the respective scissor arm 563, 564, with an increasing radius of curvature towards the second end. This increases the ramp angle as the arms are initially deployed, in turn increasing the magnitude of the wedging action, thereby reducing the biasing force required to move the scissor arms from an initial retracted position. This helps reduce the force required as the actuator 565 acts in a direction perpendicular to the direction of movement of the first and second rails 561, 562, which would otherwise lead to excessive forces being required if the curved slot arrangements were not used. For example, this reduces the force required from about 300 kg-240 kg with a non-curved arrangement to about 70 kg, thereby significantly reducing the required actuator strength.

It will be appreciated that a similar wedging action could be achieved using an angled linear slot, including a slot with multiple linear section. However, the use of the curve progressively changes the ramp angle as the scissor arms open and so provides more efficient use of actuator force as the scissor arms move from the retracted to extended positions. In particular the ramp angle provided initially arises due to the curved profile of the slot, whilst gradually transitioning to the angle being provided by the angle of the scissor arms, as the arms are raised. Use of an appropriately curved slot can therefore ensure good and preferably even force profile as the arms are deployed.

Each scissor arm 563, 564 typically includes two laterally spaced interconnected side plates, the side plates of one scissor arm 563 being located between the side plates of the other scissor arm 564, and each side plate including a respective slot 561.3, 562.3, with the biasing pin 565.2 extending through the slots in each side plate.

The actuator 565 can be of any appropriate form, and could include a pneumatic piston, but more typically includes a threaded linear drive, which can provide a high degree of torque and hence significant longitudinal force in a minimal form factor.

The actuator 565 could be coupled to one of the first and second rails 561, 562 but more typically is supported by supporting arms 567, 568 which are pivotally mounted to the actuator via a supporting pin 565.1 and mounted at opposing second ends to the first and second rails via respective pivot pins 568.2, 567.2. This supports the actuator parallel to the rails, ensuring biasing force is applied evenly to both the first and second pivot arms, in turn reducing the overall force required for operation, and reducing the likelihood of failure or jamming due to unbalanced forces.

In this example, each of the supporting arms 567, 568 are formed from laterally spaced interconnected side plates, with the side plates of one scissor arm being located between the side plates of the other scissor arm and the biasing pin extending through slots in each side plate as shown.

It will be appreciated that while the scissor mechanism is described above with reference to the application of lifting a roof on a caravan, the scissor mechanism could be used more broadly for other applications where it is desired to relatively move first and second bodies. This could include a wide range of applications, and reference to use with caravans or other towable vehicles is not intended to be limiting. It will also be noted that in other arrangements the use of rails may not be required, with similar functionality being achieved by suitably mounting the arms directly to the bodies.

In one example, the towable vehicle further includes one or more drives that drive a respective wheel, with the at least one drive being supported by a corresponding suspension assembly. This arrangement can be used to allow the towable vehicle to be moved independently of a vehicle and/or to provide drive assistance to a vehicle, for example to assist in low traction situations, such as moving the towable vehicle from a bogged situation In one example, the drive includes a motor, a motor gear coupled to the motor, a drive gear mounted on the axle and a drive actuator that selectively engages the motor and drive gears to thereby selectively engage the drive. This allows the drive to be engaged and disengaged as required, so that for example, the drive is only engaged and used in low speed scenarios. However, it will be appreciated that a variety of different drive arrangements could be used, such as hub motors provided on each wheel or the like.

A specific example drive arrangement will now be described with reference to FIGS. 6A to 6D. For the purpose of this example, similar reference numerals to those used in FIGS. 3A to 3F increased by 300 are used to denote similar features, and these will not therefore be described in detail.

In this example, the drive system includes a drive gear housing 628.1, which is mounted around the axle 622, and coupled to the first swing arm 621.11 by a drive mounting 628.2. A motor mounting 628.3 extends inwardly in from a rear of the drive gear housing 628.1, supporting a motor 628.4 adjacent to an actuator in the form of a solenoid 628.5. The motor is coupled to a slidable motor gear 628.6, which extends into the drive gear housing 628.1 to engage a drive gear 628.7 mounted on the axle 622. In use, the solenoid can be used to slide the motor gear 628.6 into and out of engagement with the drive gear 628.7, to thereby activate or deactivate the drive.

In this example, a brake disc 629.1 is mounted outwardly of the drive gear housing 628.1, with a brake assembly 629.2 being attached to the drive gear housing 628.1, to support this relative to the brake disc 629.1.

The towable vehicle also typically includes a control system adapted to control operation of the suspension assemblies. The control system typically includes a compressed air supply, feed lines coupling the compressed air supply to the airbags, a number of control valves and a controller that controls the control valves to thereby selectively supply air to the airbag to thereby adjust the suspension height. This arrangement allows the position of each of the wheels to be controlled independently and/or in conjunction.

As mentioned above, the towable vehicle can also include a drive coupled to at least one of the wheels and a controller for controlling the drive to thereby drive the at least one wheel.

The controller can control the suspension and/or drive in accordance with signals from a chassis orientation sensor, input commands provided by a user, signals from a remote client device or signals from a vehicle. This allows control to be performed automatically, for example based on operation of sensor signals and/or a towing vehicle, and/or manually, depending on the preferred implementation.

Figure 7:
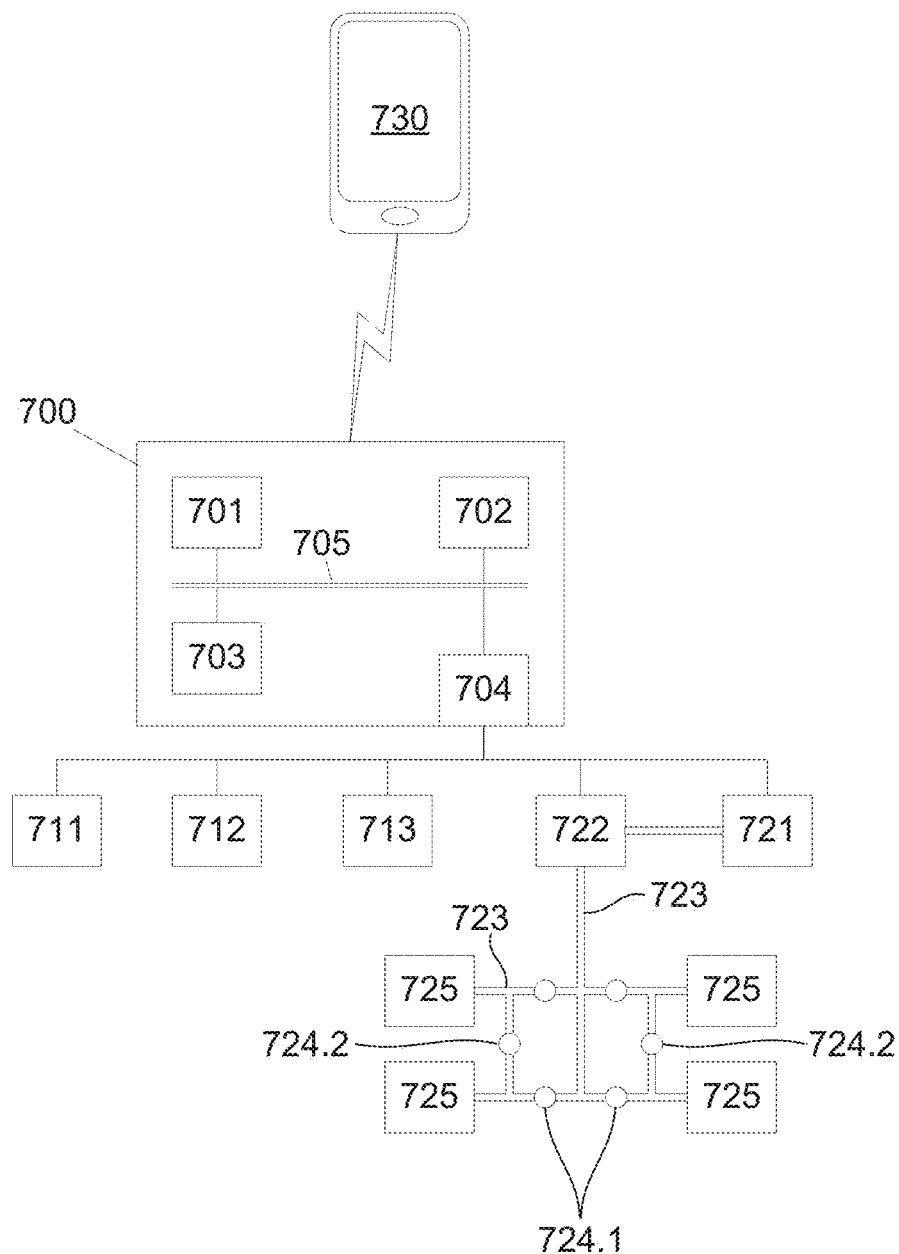
FIG. 7 is a schematic diagram of an example of a control system.

A specific example of the control system for a caravan will now be described with reference to FIG. 7.

In this example, the control system includes a controller 700 which may optionally communicate with a remote client device 730, such as a laptop, PC, a tablet, a smart phone, or the like, using a wired or wireless connection, optionally via a communications network, such as a Wi-Fi network or the like.

The controller 700 typically includes at least one microprocessor 701, a memory 702, an optional input/output device 703, such as a keyboard, keypad, input switches, a display and/or touch screen, and an external interface 704, interconnected via a bus 705. In this example the external interface 704 can be utilised for connecting the controller 700 to peripheral devices, such as a communications network and/or the client device and/or to parts of the towable vehicle as will be described below. Although a single external interface 704 is shown, this is for the purpose of example only, and in practice multiple interfaces using various methods (e.g. Ethernet, serial, USB, wireless or the like) may be provided.

In use, the microprocessor 701 executes instructions in the form of applications software stored in the memory 702 to allow the required processes to be performed. The applications software may include one or more software modules, and may be executed in a suitable execution environment, such as an operating system environment, or the like.

Accordingly, it will be appreciated that the controller 700 may be formed from any suitable processing system, such as a suitably programmed micro PC, or the like, although this is not essential and alternatively the controller could be any electronic processing device such as a microprocessor, microchip processor, logic gate configuration, firmware optionally associated with implementing logic such as an FPGA (Field Programmable Gate Array), or any other electronic device, system or arrangement.

In one example, the controller 700 can be controlled remotely using the client device 730, for example via an app installed on the client device, that is configured to provide instructions to the controller 700, allowing certain control processes to be implemented.

The control system 700 is typically coupled to one or more sensors 711, a vehicle drive management system 712, a number of wheel drives 713, and a pneumatic system. The pneumatic system typically includes an air supply, which could be in the form of a compressor 721 coupled to a storage tank 722. Feedlines 723 are provided which are coupled to the airbags 725 via a number of control valves 724.

In use, the controller 700 selectively actuates the compressor 721 to replenish a supply of compressed air in the storage tank 722 as required. The controller selectively activates the control valves 724 allowing compressed air to be delivered to, or removed from the airbags 725, allowing these to be inflated or deflated as required thereby controlling the suspension position and hence the height and/or orientation of the vehicle. In one particular example, each suspension assembly can be controlled independently. Additionally, lateral suspension assemblies can be slaved so that a mean height is maintained, whilst allowing the fore and aft wheels to extend and retract as required, for example allowing the vehicle to scale obstacles without grounding.

A drive system can optionally be provided which includes drives 713 coupled to respective wheels, with each drive typically including a motor and actuator as described above. An individual drive may be provided for each wheel allowing the wheels to be independently driven. In the case of a four wheeled towable vehicle, each wheel could be driven or alternatively single wheels on each side of the vehicle could be driven.

The control system 700 can activate the suspension assemblies and wheel drives 713 in a variety of circumstances. This can include based on input commands supplied via the I/O device 703 or could be received from a client device 730. Alternatively, the signals could be received from a vehicle computer 712, which provides information regarding operation of the vehicle. Sensors 711 can be provided to detect the characteristics of the towable vehicle, such as an orientation of the vehicle which in turn can be used to control the suspension assembly.

The above control system allows a wide range of different control scenarios to be implemented.

For example, this allows individual wheels to be raised or lowered as required, allowing wheels to be selectively used, so that if a wheel becomes inoperable for example due to a puncture, this allows the wheel to be raised to prevent further damage to the wheel. This also allows a user to manually adjust suspension height, for example retracting the wheels to lower the towable vehicle on highway or other road driving scenarios, or extending the suspension to raise the vehicles in off-road scenarios. Ground clearance sensors, such as radar or lidar could be used to adjust wheel height dynamically allowing a user to set a minimum ground clearance, with this being maintained as the vehicle traverses terrain through appropriate adjustment of the wheel positions. The vehicle can also be adapted to self-level, using onboard sensors to detect pitch and roll of the towable vehicle, and with wheel heights being adjusted to compensate as needed. The vehicle can also be lowered and/or tilted, for example, to lower a rear of the vehicle to facilitate ingress, egress, loading or unloading.

The drives 713 can be activated manually, for example allowing the towable vehicle to be moved in absence of a towing vehicle. This can be useful in positioning the towable vehicle in situations where available space is constrained, for example allowing a user to unhitch a caravan and more easily park this on a campsite. The towable vehicle can also be operated based on signals from a vehicle to thereby activate a drive in the event that the vehicle loses traction, for example if the vehicle and/or towable vehicle become bogged, whilst deactivating the drives if the vehicle exceeds a set speed, thereby preventing damage to the motor.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

What is claimed is:
1. A towable vehicle including:
   a) a chassis;
   b) at least two wheels; and,
   c) a suspension assembly supporting each wheel, the suspension assembly including:
      i) a swing arm pivotally mounted to the chassis;
      ii) an axle mounted proximate an end of the swing arm, the wheel being mounted on the axle;
      iii) at least one shock absorber extending from the chassis to the swing arm;
      iv) an airbag swing arm mounting pivotally coupled to the swing arm proximate the axle;
      v) an airbag chassis mounting coupled to the chassis;
      vi) an airbag coupled to the airbag swing arm and airbag chassis mountings so that inflation of the airbag allows a suspension height to be adjusted over an operating range, wherein the airbag is mounted substantially above the axle; and,
      vii) a pivot arm pivotally mounted to the chassis and the airbag swing arm mounting to maintain an orientation of the airbag swing arm mounting over the operating range;
   d) wherein the towable vehicle includes a roof section that can be moved between retracted and extended positions using a scissor mechanism, the scissor mechanism including:
      i) a first rail mounted to the body;
      ii) a second rail mounted to the roof section;
      iii) a pair of scissor arms including:
         (1) a first scissor arm having:
         (2) a first end pivotally mounted to the first rail;
         (3) a second end slidably mounted to the second rail; and,
         (4) a curved slot extending from a center of the arm proximate the second end to an inner edge of the arm proximate a mid-point;
      iv) a second scissor arm having:
         (1) a first end pivotally mounted to the second rail;
         (2) a second end slidably mounted to the first rail; and,
         (3) a slot extending from a center of the arm proximate the second end to an inner edge of the arm proximate a mid-point;
      v) a pivotal connection between the mid-points of the first and second arms;
   e) an actuator; and,
      i) a biasing pin slidably mounted within the slots so that movement of the biasing pin along the slots by the actuator causes the scissor arms to pivot about the pivotal connection thereby moving the roof section relative to the body.

2. The towable vehicle according to claim 1, wherein at least one of the pivot arm and the swing arm are adjustable to at least one of:
   a) adjust an orientation of the airbag swing arm mounting; and,
   b) control a degree of tension or compression in the pivot arm.

3. The towable vehicle according to claim 2, wherein at least one of:
   a) the pivot arm is adjustable by adjusting at least one of:
      i) a length of the pivot arm; and,
      ii) a pivot position of the pivot arm; and,
   b) the pivot arm is pivotally mounted to a pivot arm cam provided in a pivot arm cam mounting in the chassis so that rotation of the pivot arm cam adjusts the pivot position of the pivot arm; and,
   c) the swing arm is pivotally mounted to a swing arm cam provided in a swing arm cam mounting in the chassis so that rotation of the swing arm cam adjusts the pivot position of the swing arm;
   d) at least one of the pivot arm and the swing arm are adjusted based on the operating range; and,
   e) the pivot arm and swing arm are coupled to the chassis with pivot points that are substantially aligned on a vertical axis.

4. The towable vehicle according to claim 1, wherein the airbag is at least one of:
   a) adjustably mounted to the airbag chassis mounting;
   b) mounted to an airbag cam provided in an airbag cam mounting on the chassis so that rotation of the cam adjusts the position of the airbag.

5. The towable vehicle according to claim 1, wherein the suspension assembly includes at least one of:
 a) two laterally spaced swing arms supporting the axle;
 b) two laterally spaced shock absorbers; and,
 c) two laterally spaced shock absorbers with the pivot arm being laterally curved to pass between the laterally spaced shock absorbers.

6. The towable vehicle according to claim 1, wherein the at least one shock absorber is mounted one of:
 a) forwardly of the airbag; and,
 b) rearwardly of the airbag.

7. The towable vehicle according to claim 1, wherein the chassis includes a base section and an elevated section raised relative to the base section, the airbag chassis mounting and shock absorber being coupled to the elevated section and the swing and pivot arms being coupled to the base section.

8. The towable vehicle according to claim 1, wherein the towable vehicle includes a body, wherein the body is a rigid body mounted to the chassis via a number of body mountings and the body mountings include an elastically deformable member to absorb forces between the chassis and body.

9. The towable vehicle according to claim 8, wherein the body is made of a number of interconnected rigid body panels, wherein the rigid body panels include beveled edges interconnected by mitre joints and joins between rigid body panels are covered by at least one of:
 a) a silicone sealant;
 b) internal joining plates spanning the join; and,
 c) external joining plates spanning the join, and wherein the joining plates are formed form at least one of:
  i. aluminium extrusions;
  ii. plastic; and,
  iii. fibre reinforced plastics.

10. The towable vehicle according to claim 1, wherein slots are at least one of:
 a) angled and curved proximate the second end of each of the scissor arms to provide a wedging action and thereby reduce a biasing force required to move the scissor arms from a retracted position; and,
 b) curved towards the centre of each of the scissor arms, with an increasing radius of curvature towards the second end of each of the scissor arms.

11. The towable vehicle according to claim 1, wherein each scissor arm includes two laterally spaced interconnected side plates, the side plates of one scissor arm being located between the side plates of the other scissor arm, and each side plate including a respective slot, the biasing pin extending through the slots in each side plate.

12. The towable vehicle according to claim 1, wherein the actuator includes a threaded linear drive.

13. The towable vehicle according to claim 1, wherein the scissor mechanism includes a pair of supporting arms for supporting the actuator relative to the scissor arms, the pair of supporting arms including:
 a) a first supporting arm having:
  i) a first end pivotally mounted to the first rail; and,
  ii) a second end pivotally mounted to the actuator; and,
 b) a second supporting arm having:
  i) a first end pivotally mounted to the second rail; and,
  ii) a second end pivotally mounted to the actuator, to thereby support the actuator.

14. The towable vehicle according to claim 13, wherein each supporting arm includes two laterally spaced interconnected supporting arm side plates, the supporting arm side plates of one supporting arm being located between the side plates of the other supporting arm at the second end of each supporting arm.

15. The towable vehicle according to claim 1, wherein the towable vehicle includes at least one drive that drives a respective one of the at least two wheels, the at least one drive being supported by a corresponding suspension assembly and wherein the drive includes:
 a) a motor;
 b) a motor gear coupled to the motor;
 c) a drive gear mounted on the axle; and,
 d) a drive actuator that selectively engages the motor and drive gears to thereby selectively engage the drive.

16. The towable vehicle according to claim 1, wherein the towable vehicle includes:
 a) a compressed air supply;
 b) feed lines coupling the compressed air supply to the airbags;
 c) a number of control valves; and,
 d) a controller that controls the control valves to thereby selectively supply air to the airbag to thereby adjust the suspension height.

17. The towable vehicle according to claim 1, wherein the towable vehicle includes:
 a) a drive coupled to at least one of the wheels, the drive including a motor and a drive actuator; and,
 b) a controller for controlling the drive to thereby drive the at least one wheel, wherein the controller controls the drive actuator to thereby selectively engage motor and drive gears and thereby mechanically couple the motor to the axle.

18. The towable vehicle according to claim 16, wherein the towable vehicle includes a controller that controls at least one of a suspension and drive in accordance with at least one of:
 a) signals from a chassis orientation sensor;
 b) input commands provided by a user;
 c) signals from a remote client device; and,
 d) signals from a vehicle.

19. The towable vehicle according to claim 1, wherein the axle is mounted on the swing arm.

\* \* \* \* \*

UNITED STATES PATENT AND TRADEMARK OFFICE
CERTIFICATE OF CORRECTION

PATENT NO. : 11,472,246 B2
APPLICATION NO. : 16/632984
DATED : October 18, 2022
INVENTOR(S) : Daniel Bosschieter, Tobias Bosschieter and Anthony Gibson It is certified that error appears in the above-identified patent and that said Letters Patent is hereby corrected as shown below:

In the Claims

Column 16, Lines 11-33 Claim 1 replace with:
-- iii) a pair of scissor arms including:
    (1) a first scissor arm having:
        (a) a first end pivotally mounted to the first rail;
        (b) a second end slidably mounted to the second rail; and,
        (c) a curved slot extending from a centre of the arm proximate the second end to an inner edge of the arm proximate a mid-point;
    (2) a second scissor arm having:
        (a) a first end pivotally mounted to the second rail;
        (b) a second end slidably mounted to the first rail; and,
        (c) a slot extending from a centre of the arm proximate the second end to an inner edge of the arm proximate a mid-point;
    (3) a pivotal connection between the mid-points of the first and second arms;
iv) an actuator; and,
v) a biasing pin slidably mounted within the slots so that movement of the biasing pin along the slots by the actuator causes the scissor arms to pivot about the pivotal connection thereby moving the roof section relative to the body. --

Signed and Sealed this
Fourteenth Day of February, 2023

*Katherine Kelly Vidal*
*Director of the United States Patent and Trademark Office*